(12) United States Patent
Haytayan

(10) Patent No.: US 8,074,348 B2
(45) Date of Patent: Dec. 13, 2011

(54) APPARATUS AND METHOD FOR FASTENING TOGETHER STRUCTURAL COMPONENTS

(76) Inventor: Harry M. Haytayan, Nashua, NH (US)

( * ) Notice: Subject to any disclaimer, the term of this patent is extended or adjusted under 35 U.S.C. 154(b) by 1068 days.

(21) Appl. No.: 11/890,832

(22) Filed: Aug. 8, 2007

(65) Prior Publication Data

US 2007/0271761 A1    Nov. 29, 2007

Related U.S. Application Data

(60) Continuation-in-part of application No. 11/168,852, filed on Jun. 28, 2005, now Pat. No. 7,377,019, which is a division of application No. 10/619,374, filed on Jul. 11, 2003, now Pat. No. 6,990,731, which is a continuation-in-part of application No. 10/195,207, filed on Jul. 15, 2002, now abandoned.

(51) Int. Cl.
  *B23Q 7/10*     (2006.01)
  *B23P 11/00*    (2006.01)
(52) U.S. Cl. .................................. 29/811.2; 29/432
(58) Field of Classification Search ................. 29/811.2, 29/809, 525, 525.01, 525.11, 816, 818, 281.5, 29/432; 227/19, 21, 22, 129, 130, 134, 140; 173/1, 93.6, 93.7; 81/464, 463; 411/387.1, 411/387.2, 387.5, 387.8, 442
See application file for complete search history.

(56) References Cited

U.S. PATENT DOCUMENTS

| | | | |
|---|---|---|---|
| 2,770,269 A | 11/1956 | Austin | |
| 2,943,652 A | 7/1960 | Chilton | |
| 2,982,595 A | 5/1961 | Rogers, Jr. | |
| 2,990,739 A | 7/1961 | Zifferer | |
| 3,056,234 A | 10/1962 | Nelsson et al. | |
| 3,157,884 A | 11/1964 | Decot et al. | |

(Continued)

FOREIGN PATENT DOCUMENTS

JP    09285971    11/1997

(Continued)

OTHER PUBLICATIONS

Muro North America, Autofeed Screwdriver Systems, website printout of FDLV41 Speed Driver.

(Continued)

*Primary Examiner* — John C Hong
(74) *Attorney, Agent, or Firm* — Pandiscio & Pandiscio

(57) ABSTRACT

An apparatus and method for fastening a wood panel to a high structural strength steel frame member using self-drilling, self-tapping screws. An electrically powered rotary driver with an attached screw driver bit is carried by a pneumatically-powered telescoping driver support/fastener-positioning unit that includes a fastener positioning plate, telescoping members attached to the fastener positioning plate, and a pair of foot plates for the operator to stand on whereby to hold the apparatus down during a screw-driving operation. The driver and the driver support/fastener-positioning unit are controlled by an electro/pneumatic system. The method implemented by that system comprises retracting the driver support/fastener positioning unit so as force the screw driver bit to engage in the positioning plate, operating the driver as the telescoping members are retracted so that the screw driver bit will cause the engaged fastener to drill in turn through the wood panel and the steel frame member and form a screw connection with the steel frame member, and then turning off the driver and re-extending the telescoping members so as disengage the screw driver bit from the driven fastener, ready for a new screw-driving operation.

33 Claims, 17 Drawing Sheets

U.S. PATENT DOCUMENTS

| | | |
|---|---|---|
| 3,221,588 A | 12/1965 | Wieber |
| 3,349,651 A | 10/1967 | Turnbull et al. |
| 3,358,548 A | 12/1967 | Dyslin |
| 3,478,639 A | 11/1969 | Gruca |
| 3,550,243 A | 12/1970 | Allsop |
| 3,651,740 A | 3/1972 | Perkins |
| 3,656,520 A | 4/1972 | Caffa |
| 3,665,801 A | 5/1972 | Gutshall |
| 3,710,676 A | 1/1973 | Ringland |
| 3,768,412 A | 10/1973 | Dardick |
| 3,803,840 A | 4/1974 | Toczycki |
| 3,933,075 A | 1/1976 | Peterson |
| 3,942,405 A | 3/1976 | Wagner |
| 3,982,464 A | 9/1976 | Sygnator |
| 4,040,554 A | 8/1977 | Haytayan |
| 4,098,354 A | 7/1978 | Alcenius |
| 4,106,618 A | 8/1978 | Haytayan |
| 4,106,619 A | 8/1978 | Haytayan |
| 4,161,242 A | 7/1979 | Moores, Jr. et al. |
| 4,347,902 A | 9/1982 | Wallace et al. |
| 4,370,906 A | 2/1983 | Gurries |
| 4,407,620 A | 10/1983 | Shinjo |
| 4,586,862 A | 5/1986 | Yamasaki |
| 4,621,963 A | 11/1986 | Reinwall |
| 4,645,396 A | 2/1987 | McCauley et al. |
| 4,726,504 A | 2/1988 | Halbert |
| 4,773,111 A | 9/1988 | Hyner et al. |
| 4,823,885 A | 4/1989 | Okumura |
| 5,046,905 A | 9/1991 | Piacenti et al. |
| 5,083,619 A | 1/1992 | Giardino et al. |
| 5,267,423 A | 12/1993 | Giannuzzi |
| 5,343,961 A | 9/1994 | Ichikawa |
| 5,366,082 A | 11/1994 | Haytayan |
| 5,520,491 A | 5/1996 | Miyagawa |
| 5,522,687 A | 6/1996 | Chen |
| 5,544,746 A | 8/1996 | Dohi |
| 5,645,208 A | 7/1997 | Haytayan |
| D383,656 S | 9/1997 | Muro |
| 5,687,801 A | 11/1997 | Paterson et al. |
| 5,759,003 A | 6/1998 | Greenway et al. |
| 5,775,514 A | 7/1998 | Lin |
| 5,984,096 A | 11/1999 | Shinjo |
| 5,987,837 A | 11/1999 | Nelson |
| 6,036,013 A | 3/2000 | Chen |
| 6,050,765 A | 4/2000 | McGovern et al. |
| 6,109,144 A | 8/2000 | Muro |
| 6,139,236 A | 10/2000 | Ito |
| 6,311,785 B1 | 11/2001 | Paterson et al. |
| 6,443,238 B1 | 9/2002 | Paterson et al. |
| 6,457,535 B1 | 10/2002 | Tanaka |
| 6,471,140 B2 | 10/2002 | Barry et al. |
| 6,520,270 B2 | 2/2003 | Wissmach et al. |
| 6,620,011 B2 | 9/2003 | Obermeier et al. |
| 6,666,638 B2 | 12/2003 | Craven |
| 6,676,353 B1 | 1/2004 | Haytayan |
| 6,811,366 B2 | 11/2004 | Chen |
| 6,918,450 B2 | 7/2005 | Lebisch et al. |
| 6,990,731 B2 | 1/2006 | Haytayan |
| 7,025,551 B2 | 4/2006 | Haytayan |
| 7,266,874 B2 | 9/2007 | Ernst et al. |
| 7,377,019 B2 * | 5/2008 | Haytayan ................. 29/432 |
| 2005/0283961 A1 | 12/2005 | Ernst et al. |
| 2008/0124187 A1 | 5/2008 | Haytayan |

FOREIGN PATENT DOCUMENTS

| | | |
|---|---|---|
| JP | 2001088048 | 4/2001 |

OTHER PUBLICATIONS

Muro North America, Autofeed Screwdriver Systems, website print-out of screws.

Computer translation of JP09285971A.

* cited by examiner

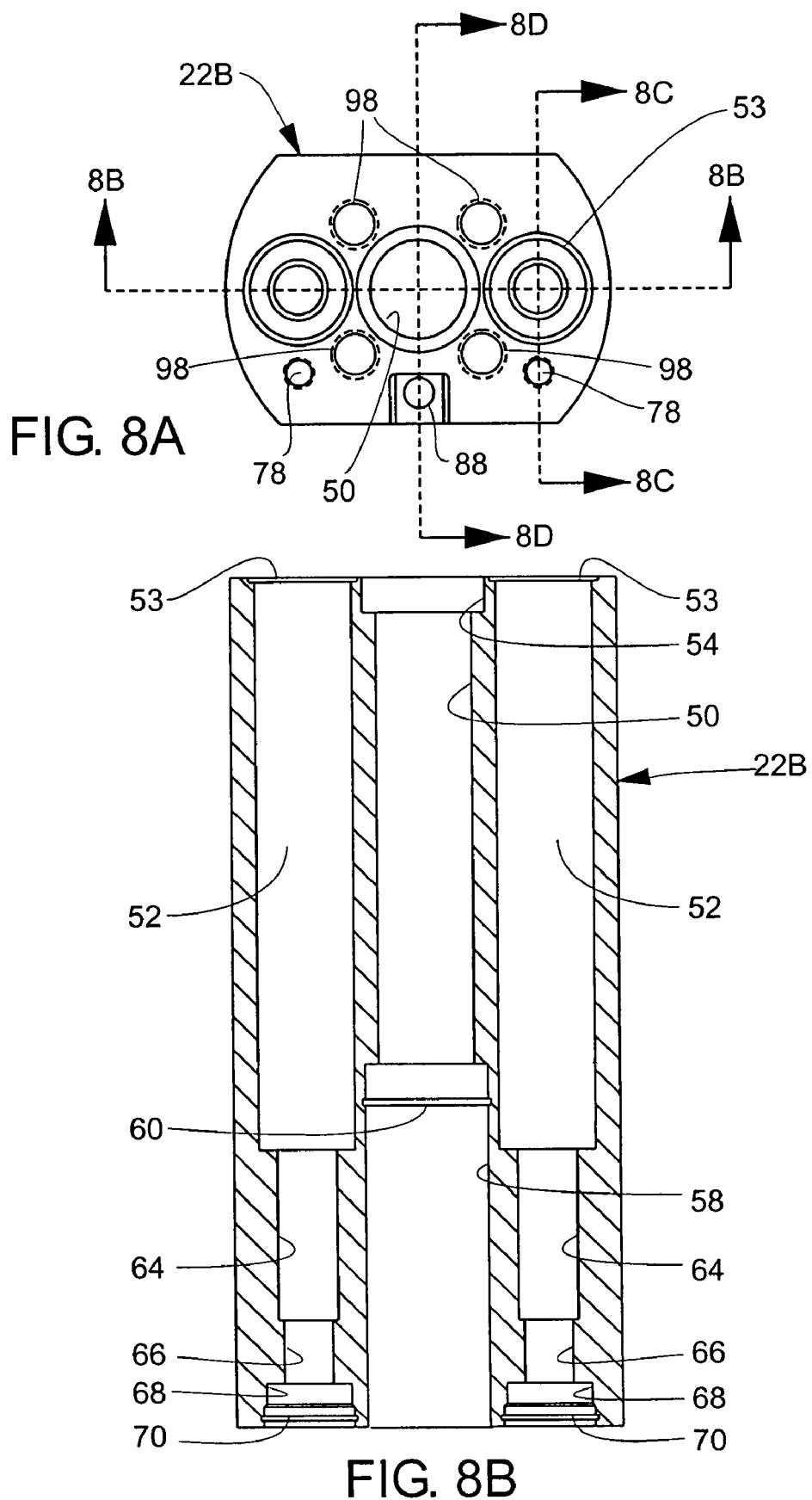

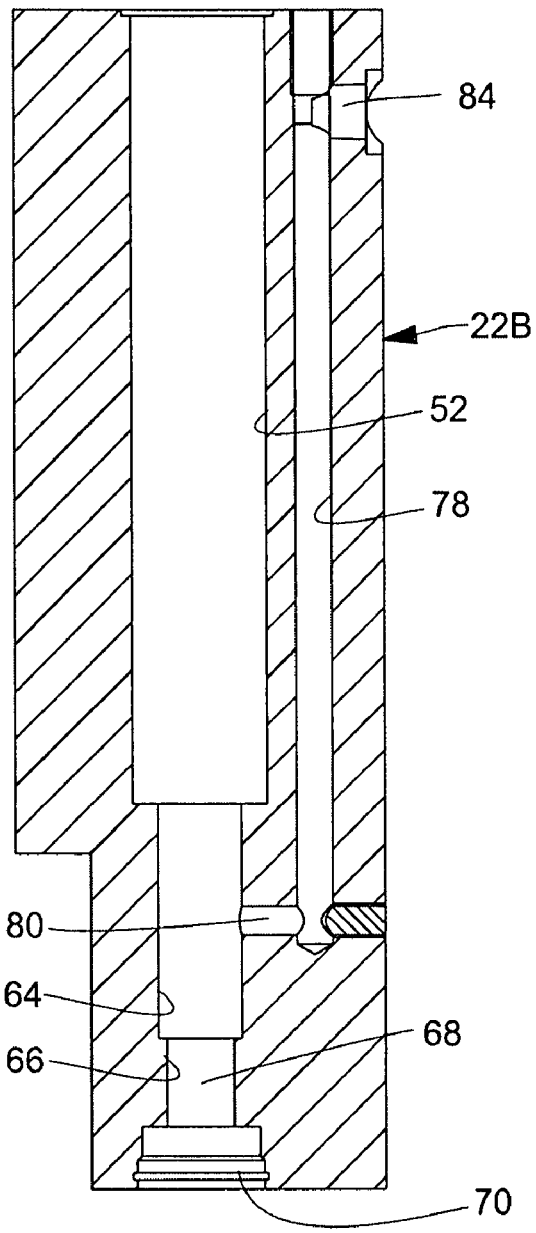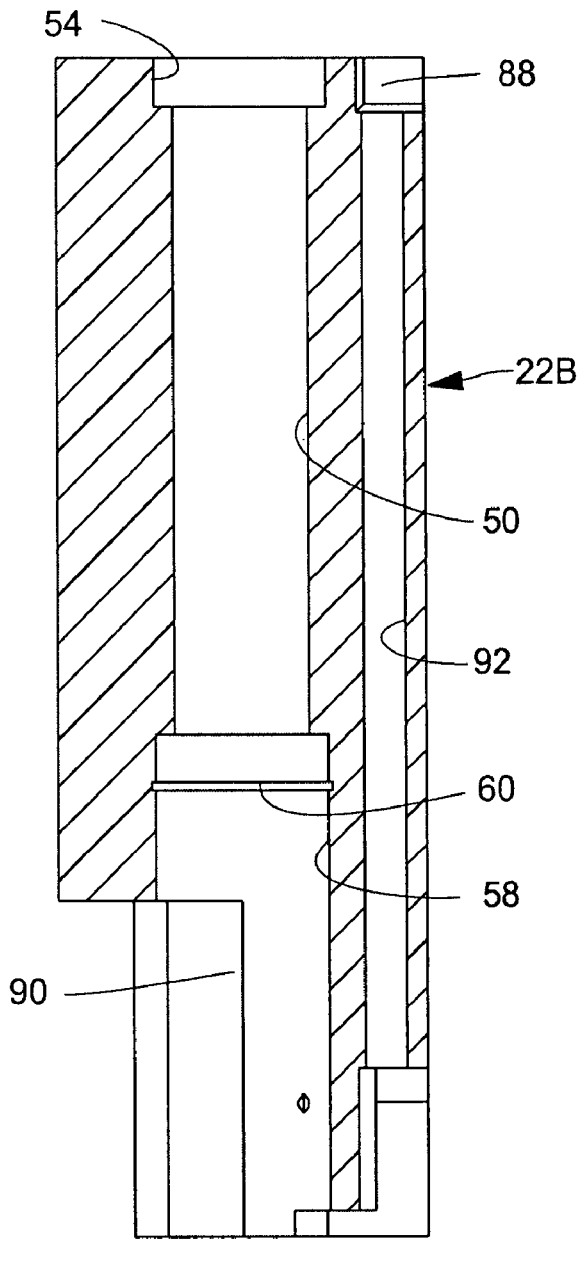
FIG. 8C
FIG. 8D

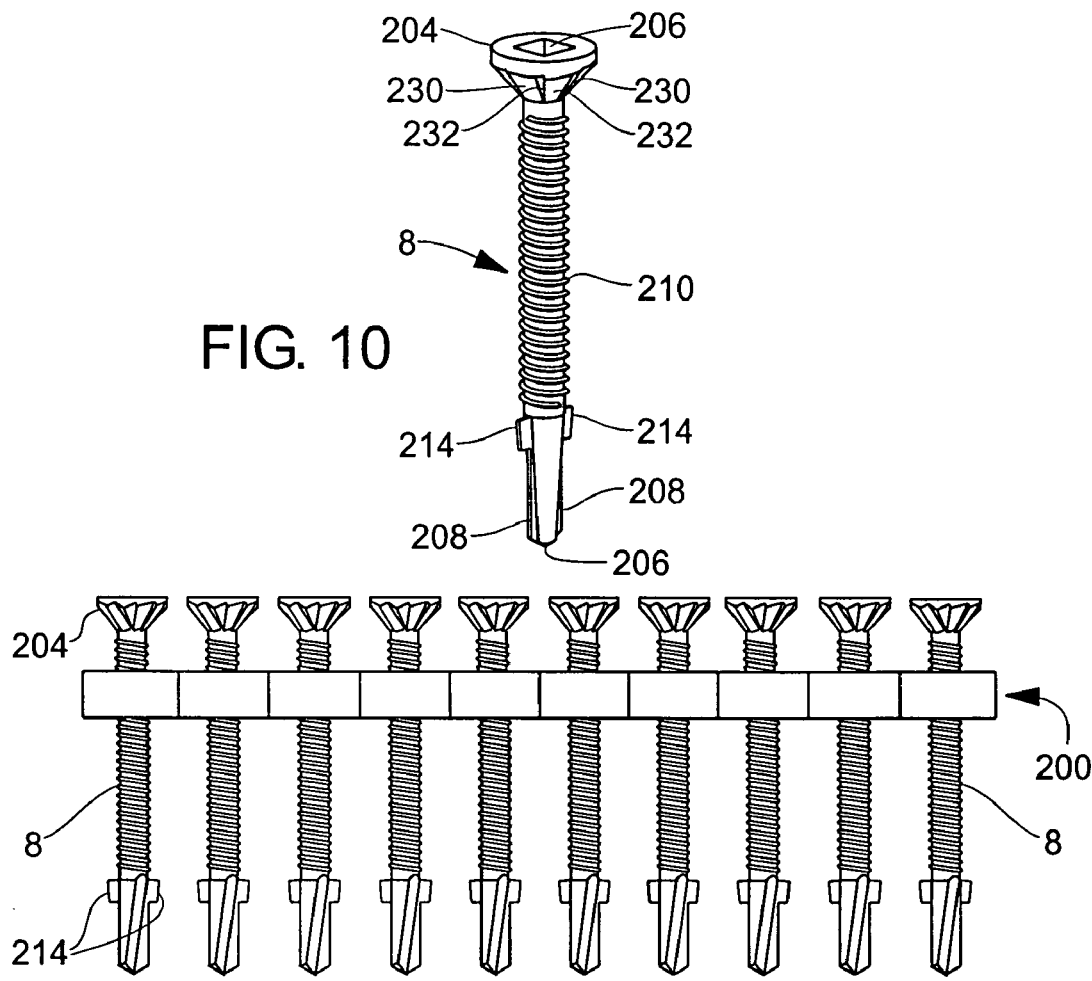
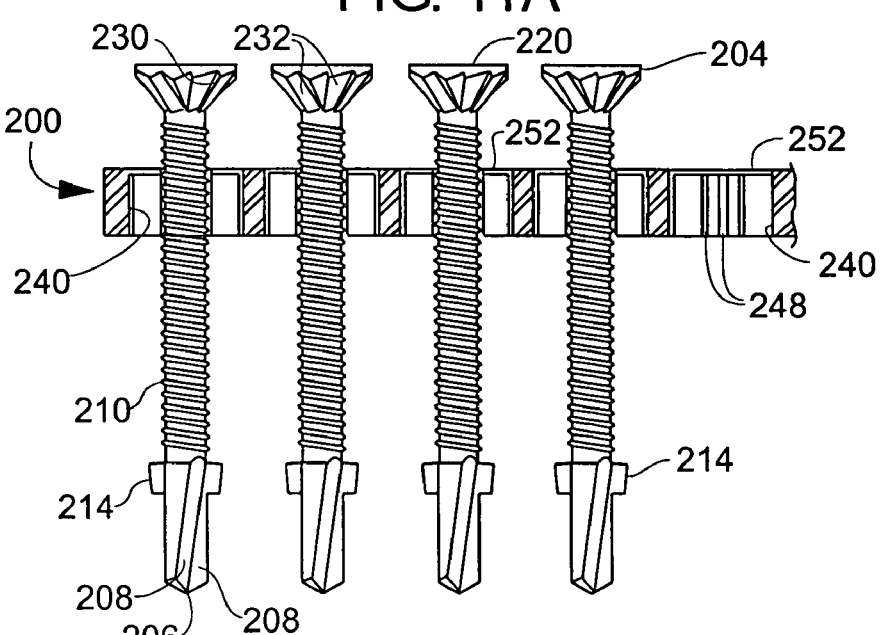

APPARATUS AND METHOD FOR FASTENING TOGETHER STRUCTURAL COMPONENTS

This is a continuation-in-part of U.S. patent application Ser. No. 11/168,852, filed 28 Jun. 2005, now U.S. Pat. No. 7,377,019 which is a division of U.S. application Ser. No. 10/619,374, filed 11 Jul. 2003 (now U.S. Pat. No. 6,990,731), which is a continuation-in-part of U.S. application Ser. No. 10/195,207, filed 15 Jul. 2002 (now abandoned) for "Method And Apparatus For Attaching Structural Components With Fasteners".

FIELD OF THE INVENTION

The present invention generally relates to a novel apparatus and method for fastening structural elements together with screw fasteners.

BACKGROUND OF THE INVENTION

It is well known to use screws and nails, or similar pin-type fasteners, for securing floor, wall and ceiling panels to supporting structures in buildings and vehicle cargo container bodies. In the case of truck trailer and cargo container bodies, hard wood floors are attached to a steel metal frame or substrate with screw fasteners. It is essential that those screws be driven in far enough to secure the flooring member in tight engagement with the underlying frame, and also that the heads of the screw fasteners not protrude above the wood flooring. One technology for securing floors to truck trailer bodies requires pre-drilling holes in both the wood flooring and the underlying metal frame members, e.g., steel angle irons, I-beams, U-channels or flat metal bars, and applying self-tapping screws through those holes to anchor the flooring to the frame. That procedure using predrilled holes is slow due to the need to pre-drill the members to be secured together. Accordingly attention has been directed to avoiding the necessity of pre-drilling the underlying frame members.

One prior approach to securing hard wood flooring or panels to aluminum or mild steel substrates or structural frame members without pre-drilling has been to use an electrically powered screwdriver operating at a relatively high speed, e.g., about 2400 rpm, and special high carbon steel self-drilling, self-tapping wing screws, e.g. the fastening system of Muro Corporation of Tokyo, Japan comprising its model FLVL41 electrically powered screwdriver and its Super Wing™ self-drilling screws. Such prior fastening systems are suitable for driving the self-drilling, self tapping wing screws through wood into aluminum frame members; and also suitable for driving screws through wood into mild steel frame members in thicknesses up to about ¼ inch, although that driving operation is relatively slow, typically taking about 15 seconds or more.

However, freight trailer body manufacturers now prefer to use frame members made of a high tensile strength steel characterized by a tensile strength of 80,000 psi and a yield strength of approximately 50,000-65,000 psi (hereinafter "HTS steel"), with the frame members having a thickness of at least ⅛ inch and as much as ⅜ inch. Prior electric powered screw driving systems using self-drilling wing screws have not been satisfactory for reliably, effectively and rapidly penetrating such high tensile strength frame members with self-drilling, self-tapping screws, and there use in such applications has been limited to screws with a maximum shank diameter of about 6 mm, exclusive of the wings, and a maximum head diameter of about 11 mm. In addition to the screws not readily penetrating the HTS steel and the screw driving process being slow (about 25 seconds), a significant limiting factor is that driving the fasteners requires the operator to exert a substantial downward force on the driver in order for the screw driver bit to drive the fastener into the high tensile strength frame member, which leads to operator fatigue. In this connection it is to be noted that the time required to drive each screw is a function of the operator-generated force exerted on the screw by the driver, the torque applied to the screw by the electrically-powered driver, and the rotational speed imparted to the screw by the driver. It is to be noted that also using an electric screw driver with a greater speed, e.g., 5000 rpm, has been found to be unacceptable since at that higher speed the heat buildup at the interface of the screws with the HTS steel frame member will cause the tips of the screws to burn up, which in turn reduces the ability of the drill portion of the screws to penetrate the steel frame member and consequently extends the time required to properly anchor the screw in that steel member. That same tip burning phenomenon has been found to occur to some extent even with drilling speeds of about 2400 rpm.

One effort to overcome the foregoing limitations of prior electric power screwdriver systems with respect to anchoring hard wood members to high tensile strength frame members is the apparatus described in my U.S. Pat. No. 6,990,731, which is incorporated herein by reference. That apparatus, which was found to be capable of rapidly driving high carbon steel self-drilling, self tapping wing screws through hard wood flooring members into high tensile strength steel frame members, comprises a pneumatically-powered impact screw driver carried by a pneumatically operated telescoping driver support/fastener positioning unit for urging the screw driver device to move in a direction that applies an axial driving force to screws. The telescoping apparatus reduces the effort that the operator needs to exert to urge the driver into engagement with the workpiece. Although that system can complete a fastening operation through ¾ to 1⅜ inch thick hardwood flooring into ⅛ inch thick HTS steel frame members using screws with a maximum shank o.d. of about 6 mm in about 12 seconds without any pre-drilling and with much less muscular effort than required with the Muro system, it has several limitations. For one thing it requires a relatively large air flow at a relatively large pressure to assure adequate stall torque and rotational speed for the driver, e.g., about 30 cubic feet/minute air flow at a pressure of about 90 psi. That requires the apparatus to be coupled to a relatively large compressor, e.g., a 25 HP electrically powered compressor. Another limitation is that the high speed of the pneumatic impact driver, about 5000 rpm when supplied with air at a pressure of about 90 psi, tends to cause burning up of the tips of the screws, particularly when attempting to install screws with a diameter in excess of 6 mm, e.g., screws with a shank diameter, exclusive of wings, of 8 mm (which are preferred for trailer truck body applications due to their greater holding power and strength). That tip burning problem can be alleviated by reducing the air pressure to decrease the driver's torque and rotational speed, but at a cost of an increase in the time required to fully drive a screw. Other limitations of that apparatus are the cost of pneumatic impact drivers and the noise that they generate.

Accordingly there has still existed the need for a screw driving and fastening apparatus that is capable of rapidly and reliably driving self-drilling, self-tapping screws into high tensile strength steel substrates having a thickness in the order of ⅛ inch to ⅜ inch without any need for pre-drilling the HTS steel substrates.

OBJECTS AND SUMMARY OF THE INVENTION

The primary object of this invention is to provide a novel and improved screw driver apparatus for driving a self-drilling, self-tapping screw through a first relatively soft structural element into a second relatively hard structural element made of metal.

Another object of this invention is to overcome the limitations of prior electrically-powered screw driver systems with respect to attaching hardwood flooring to high tensile strength steel substrates, notably in the attachment of flooring to underlying structural frame members of freight bodies, large shipping containers and similar structures.

Another object is to provide an electrically powered screw driver apparatus for the purpose described that incorporates means for reducing the force required to be exerted on the screw driver by the operator during a screw driving operation.

A further object of the invention is to provide an apparatus that improves upon the apparatus disclosed in my U.S. Pat. No. 6,990,731 by using an electrically-powered driver instead of a pneumatic driver.

A further object of the invention is to provide an improved apparatus for attaching screw fasteners that combines an electric rotary screw driver with a pneumatic telescoping driver support/fastener positioning means that reduces user fatigue in operating the apparatus.

A further object is to provide a screw driver apparatus for the purpose described that comprises an electrically powered screw driver, and a pneumatically powered telescoping driver support means that is designed to move the electric screw driver toward and away from the workpiece, e.g., wood flooring and steel frame members, with the driver support means carrying foot rests whereby the user's body weight may be used to stabilize the screw driver apparatus during a screw driving operation.

An other object is to provide an electrically powered screw driver apparatus that includes a magazine that accommodates a clip of fasteners in the form of a plastic strip comprising a carrying a plurality of screws, with the magazine operating to advance the clip so that each fastener in turn is positioned to be driven by the driver.

These and other objects are achieved by providing a tool that comprises an electrically powered rotary driver with means for supporting and rotatively driving a screw driver tool bit that is adapted to make a locking engagement with the head of a screw fastener, a magazine for supporting a strip of screw self-drilling, self-tapping fasteners, a pneumatically-powered telescoping driver support/fastener positioning means comprising a fastener positioning member for receiving individual fasteners from the magazine in a position to be driven and telescoping means connecting the fastener positioning member and the electrically powered rotary driver for bringing the tool bit into driving engagement with a fastener received by said fastener positioning member, whereby powered rotation of the tool bit by the driver can cause that fastener to penetrate and secure together structural members such as wood flooring and steel substrates, and electro/pneumatic means coupled to said electrically powered rotary driver and said telescoping driver support/fastener positioning means for controlling operation of said driver and driver support means.

Other features and advantages of the invention are described or rendered obvious by the following detailed specification.

THE DRAWINGS

All of the drawings relate to a screw driving apparatus that constitutes a preferred embodiment of the invention preferred embodiment of the invention.

FIG. 8A is a top plan view of the lower housing section.

FIGS. 8B-8D are sectional views taken along lines 8B-8B, 8C-8C and 8D-8D respectively of FIG. 8A.

FIG. 10 is a side view of a preferred form of screw fastener used with the present invention.

FIG. 11A is a side view in elevation of a clip of fasteners comprising a plastic strip carrying a plurality of the same screw fasteners.

FIG. 11B is a fragmentary longitudinal sectional view of the plastic strip with fasteners.

In the drawings, like parts are identified by like numerals.

DETAILED DESCRIPTION OF THE INVENTION

Figure 1:
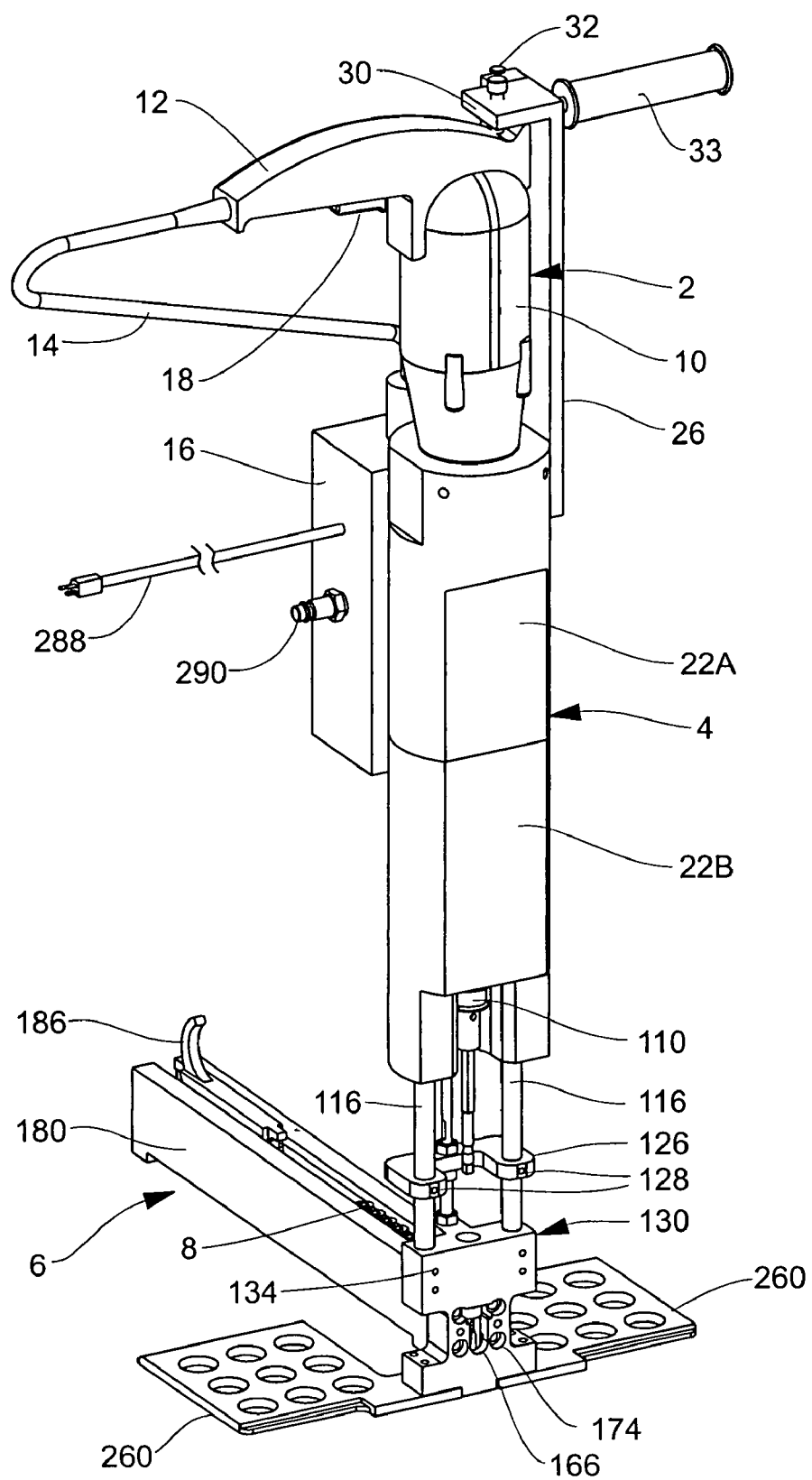
FIG. 1 is a front perspective view.

Referring to FIGS. 1-4, the illustrated apparatus includes and utilizes an electrically-powered rotary driver 2 ("electric driver") that preferably, but not necessarily, is adapted to operate in both forward and reverse directions. Electric drivers are made and sold by numerous companies. The rotary output shafts of such drivers are commonly fitted with means, e.g. chucks, for securely attaching thereto drills, screw driver bits, brushes or other tools.

Still referring to FIGS. 1 and 2, the electric driver 2 is attached to a telescoping driver support/fastener positioning unit 4 to which is attached a magazine 6 that carries a supply of fasteners 8 as hereinafter described. Driver 2 has a housing 10 and a handle 12 that is provided with an electric power cord 14 for attaching the driver to a source of electric power via a control system hereinafter identified and described that is contained in a box 16 mounted on the unit 4. Preferably the driver's electric motor is adapted for use with a 110-120 volt or 220 volt/50-60 cycle a.c. power source. The driver has a trigger 18 for actuating an on/off power switch that forms part of the drive and that connects power cord 14 with the driver's electric motor. The driver's electric motor and power switch are not shown in FIGS. 1 and 2, but they are represented schematically in FIG. 12 and identified by the numerals 2A and 18A respectively. Referring to FIGS. 4A, 4B, 6A and 6B, driver 2 has a rotary output shaft or spindle 20 and attached to it is a drive shaft 100.

The unit 4 comprises a hollow housing in the form of upper and lower sections 22A and 22B (FIGS. 1, 2, 4B, 5B, 7A-7D, and 8A-8D). Driver 2 is secured to the upper section 22A by means of an elongate support bar 26. The bottom end of bar 26 is attached to upper housing section 22A by screws 28 (FIG. 4A), while its upper end has a right angle section 30 that overhangs the driver and has a set screw 32 that releasably engages the handle section of the driver, whereby the driver is locked to upper housing section 22A. Also attached to bar 26 is an auxiliary handle 33 that permits two-handed gripping of the apparatus when it is used to drive screw fasteners. Use of set screw 32 facilitates removal of the driver for repair and replacement.

Figure 5A:
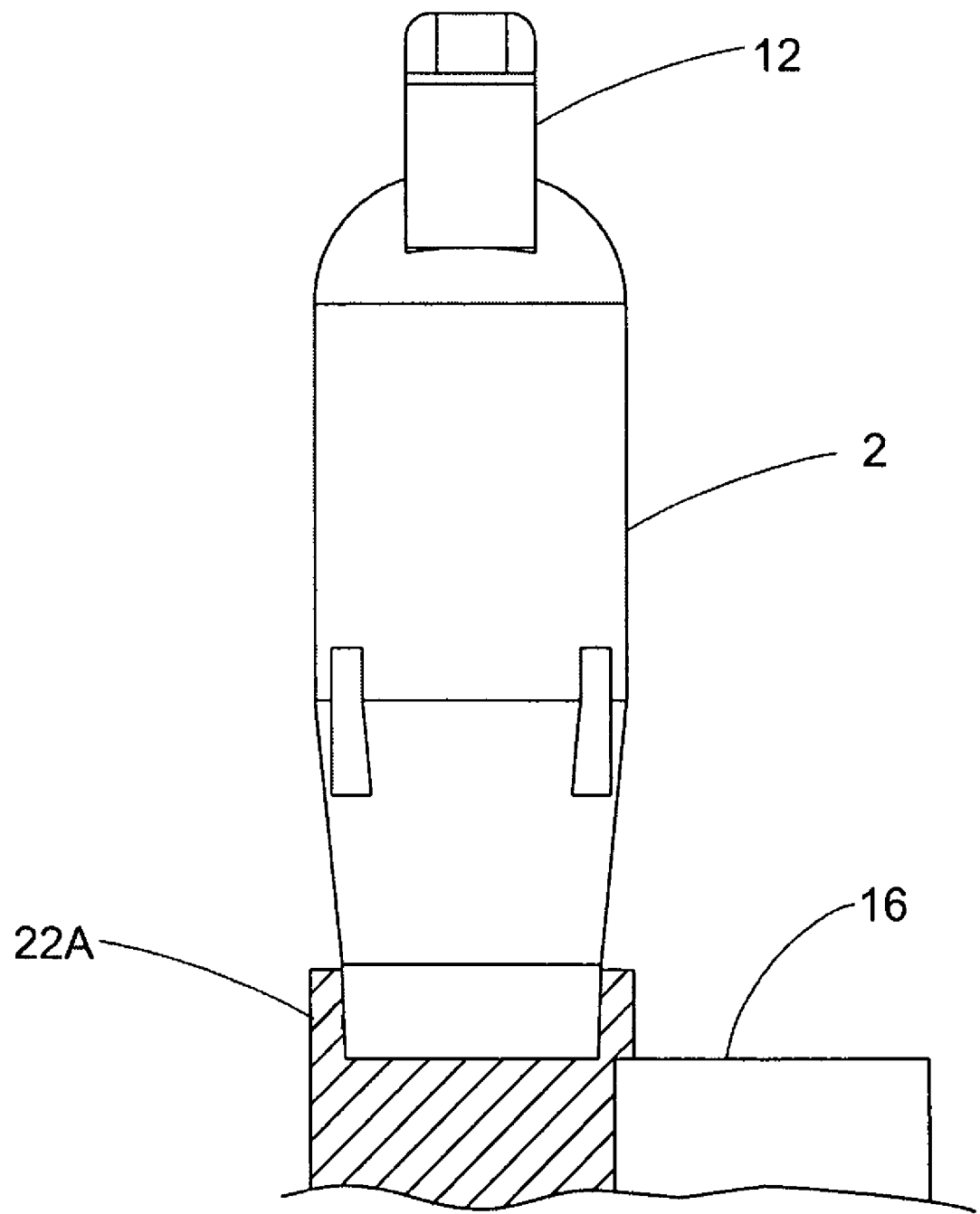
FIGS. 5A and 5B are fragmentary vertical sectional views of upper and lower portions of the apparatus taken along line 5-5 of FIG. 3.
Figure 5B:
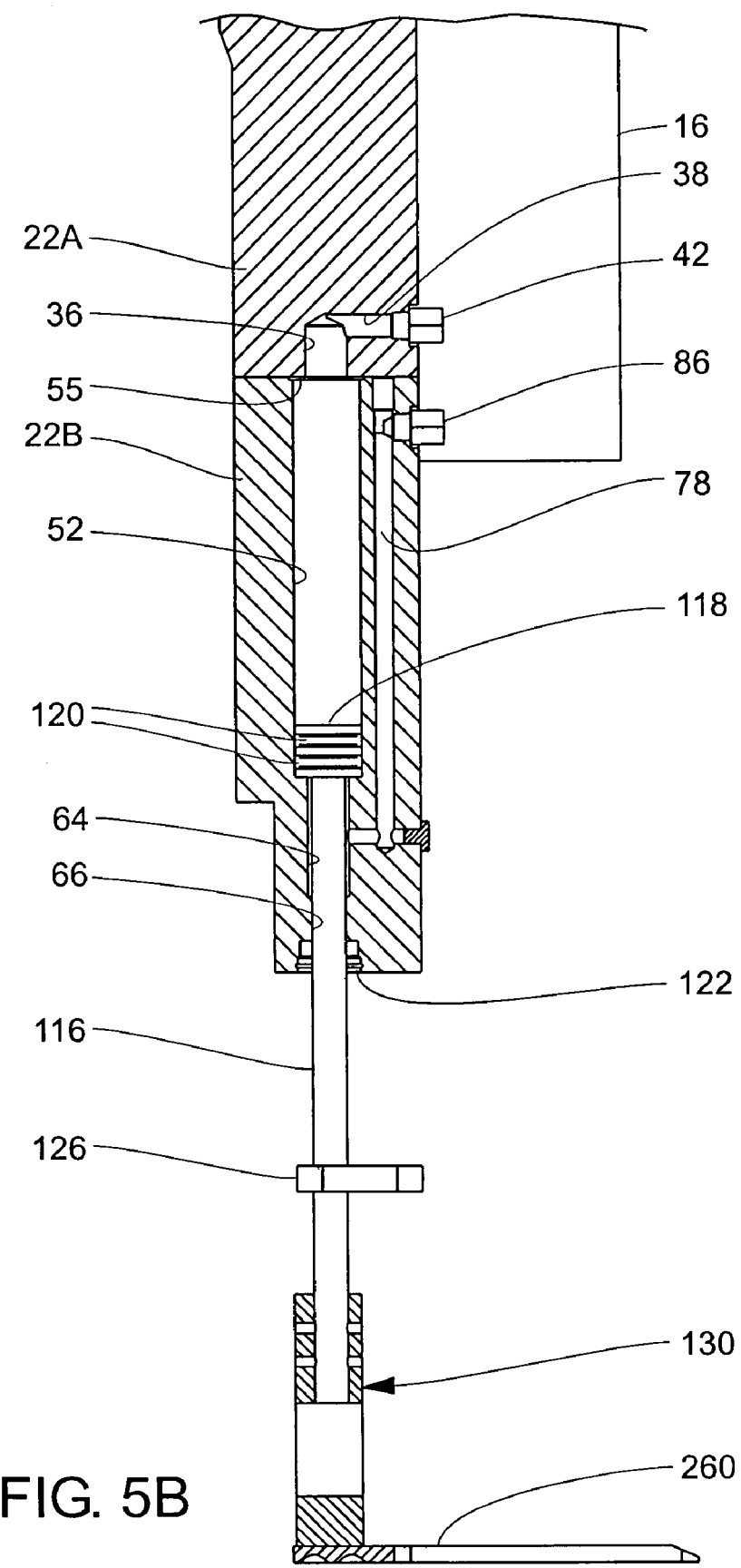
Figure 6A:
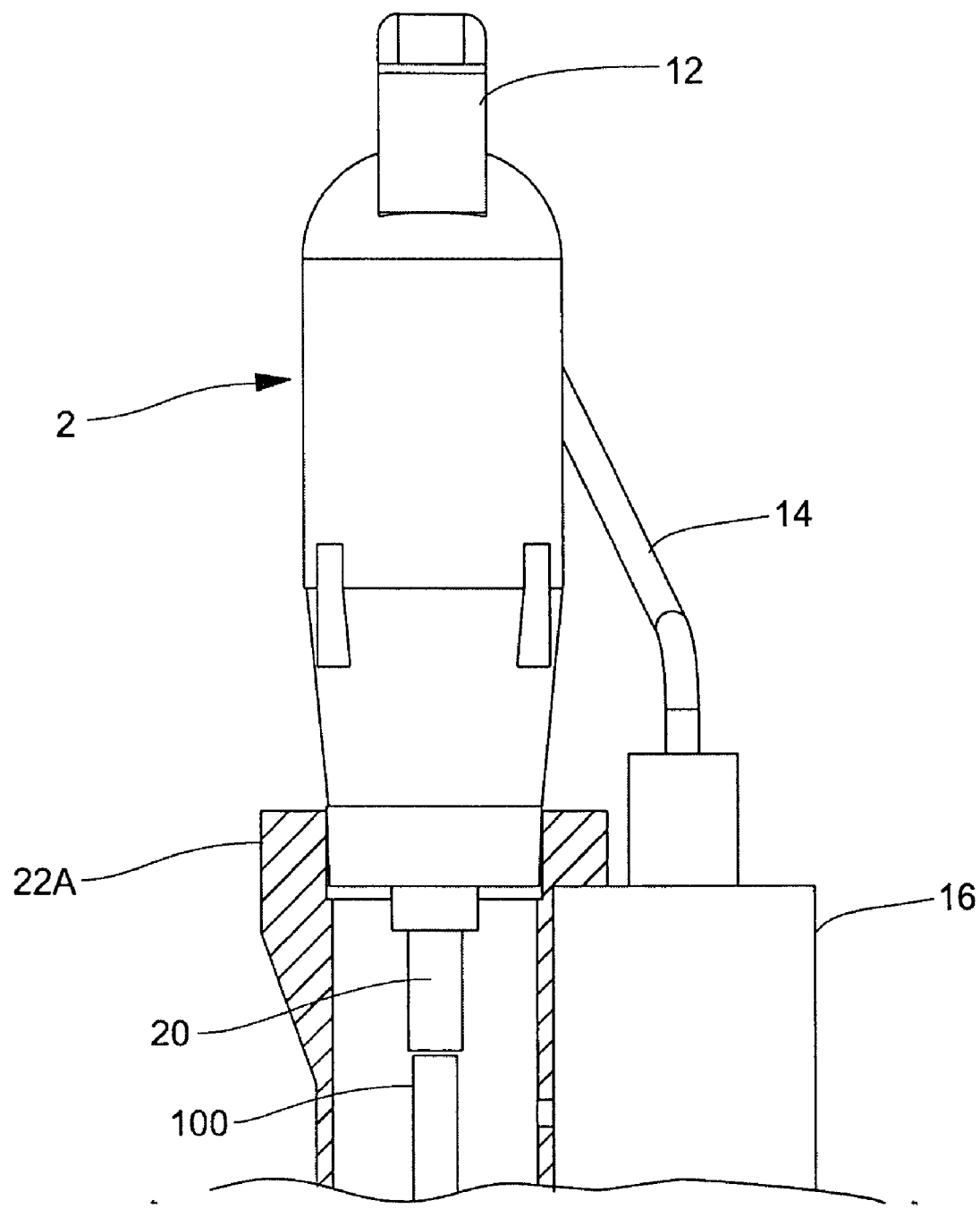
FIGS. 6A and 6B are fragmentary vertical sectional views of the upper and lower portions of the apparatus taken along line 6-6 of FIG. 3.
Figure 6B:
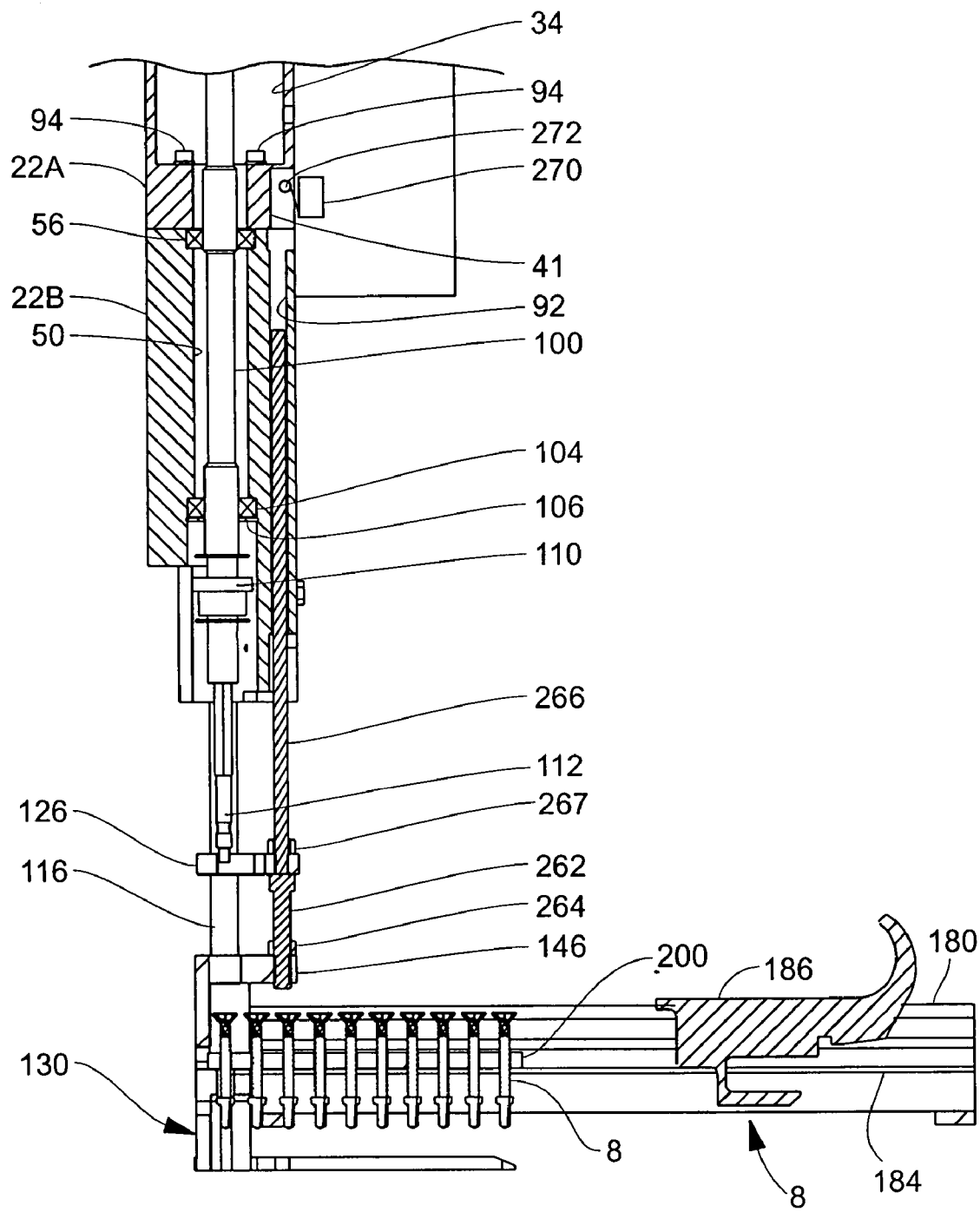
Figure 7A:
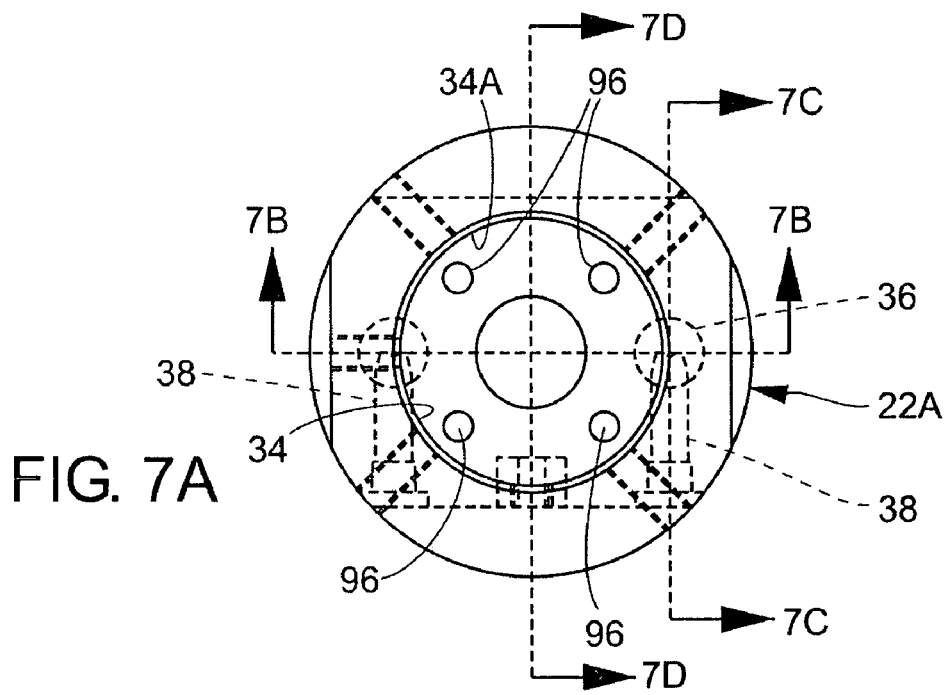
FIG. 7A is a top plan view of the upper section of the housing.
Figure 7B:
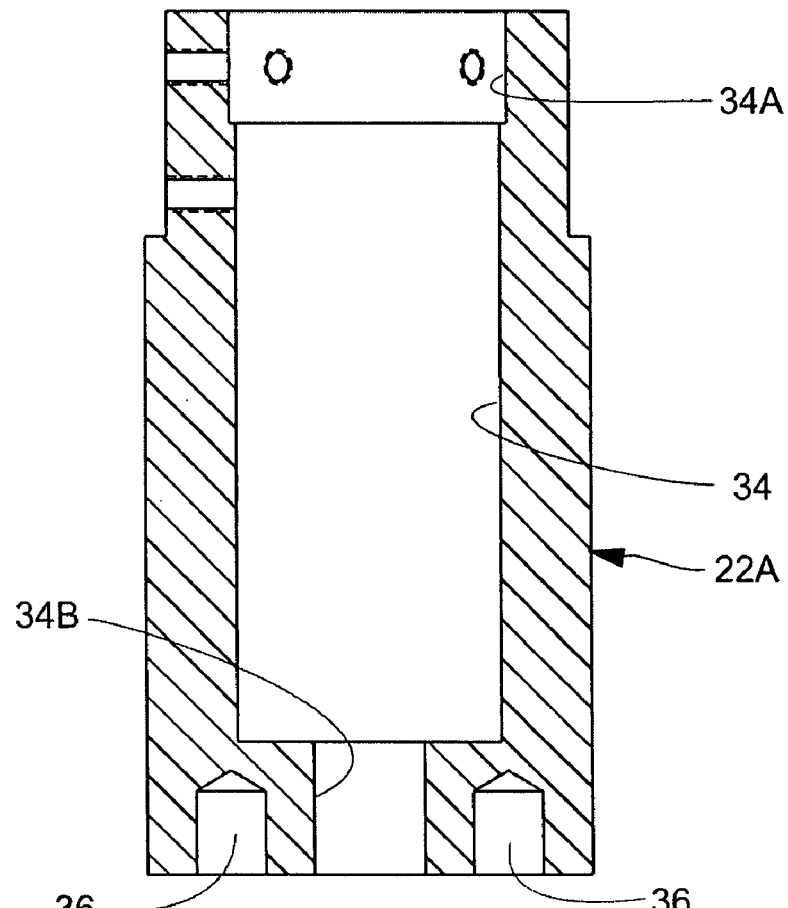
FIGS. 7B to 7D are sectional views taken along lines 7B-7BD, 7C-7C and 7D-7D respectively of FIG. 7A.
Figure 7C:
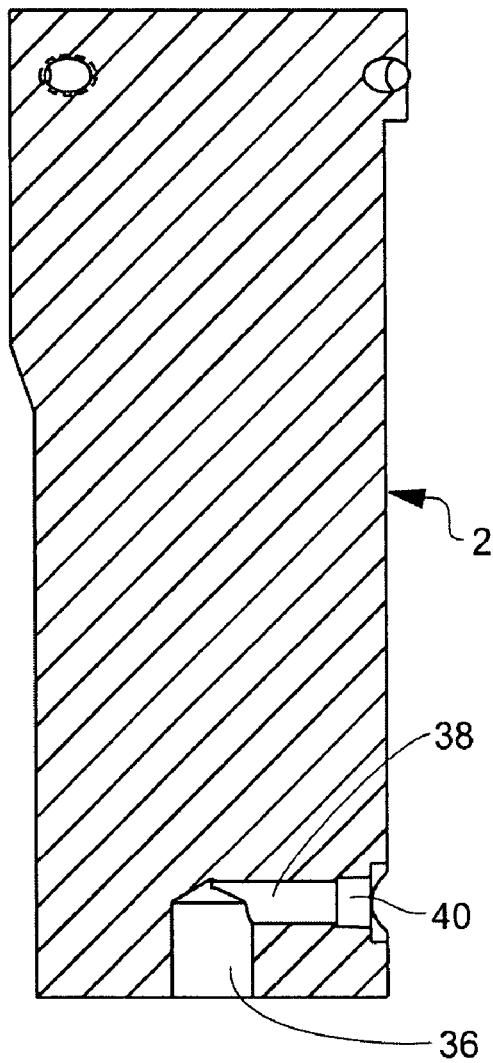
Figure 7D:
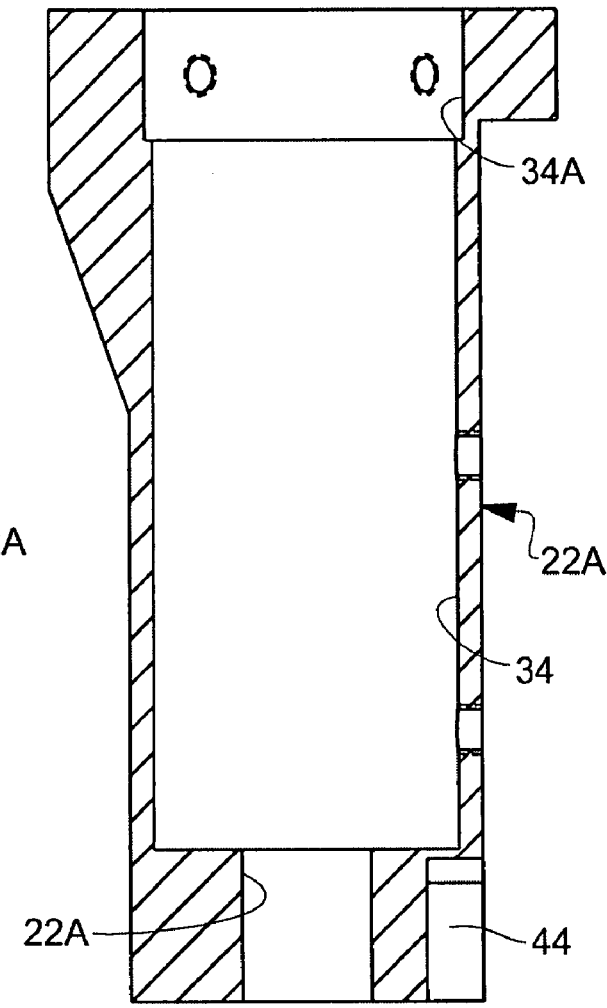
Figure 9A:
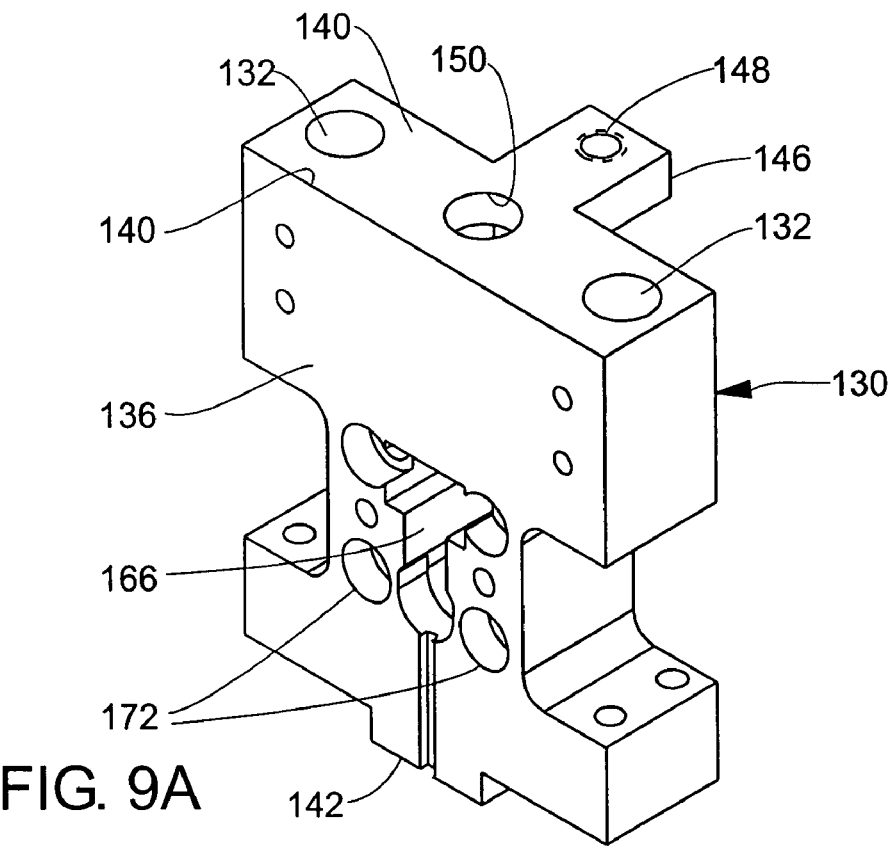
FIG. 9A is a front perspective view of a fastener positioning plate that also serves as a support for the magazine that holds the fasteners.
Figure 9B:
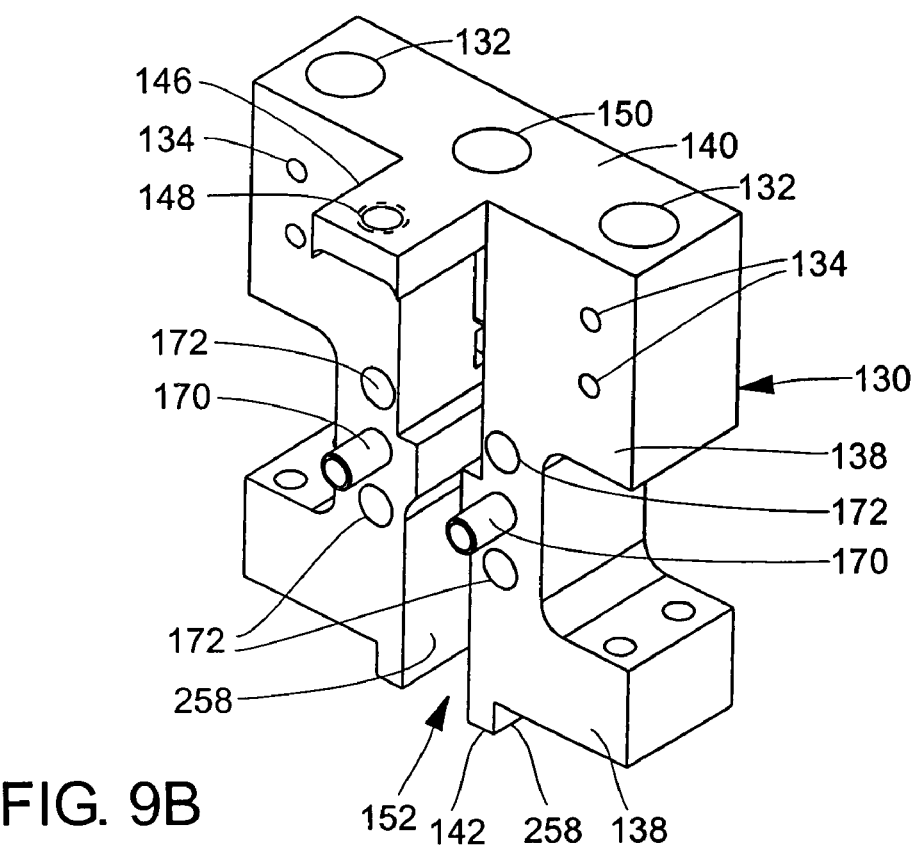
FIG. 9B is a rear perspective view of the same positioning plate.
Figures 9C, 9D:
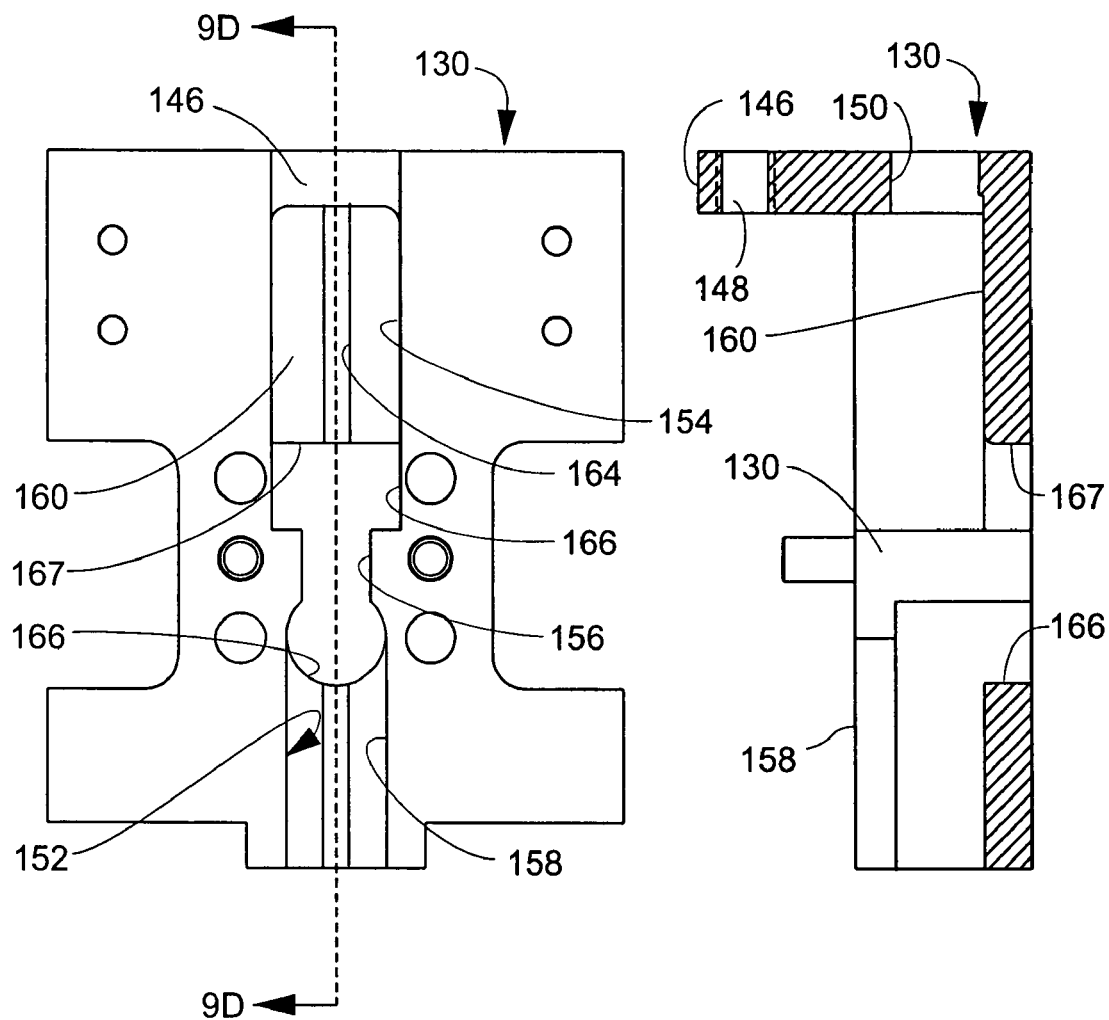
FIG. 9C is a rear elevational view of the positioning plate.
FIG. 9D is a sectional view taken along line 9D-9D of FIG. 9C.

Referring to FIG. 7A-7D, upper housing section 22A has a central bore 34 with a counterbore 34A (FIG. 4A) at its top end that serves as a seat for driver housing 10. The bottom end of center bore 34 has a reduced diameter section 34B. The bottom end of housing section 22A also is formed with two holes 36 that are disposed in diametrically opposed alignment with center bore 34. Additionally housing section 22A has two like air passageways 38 (FIGS. 7A, 7C), each of which extends at a right angle to and intersect a different one of the two holes 36. The outer ends of passageways 38 are enlarged as shown at 40 and fitted with threaded hose connectors 42 (FIG. 5B) for use in attaching hoses for passing air, as described hereinafter in connection with the electro/pneumatic control system shown in FIG. 12. The lower end of housing section 22A also is notched at one side to provide a recess 44 (FIGS. 6B, 7D).

Referring now to FIGS. 4B, 6B, 7A and 8A, the upper and lower housing sections 22A and 22B are secured together by four machine bolts 94 that extend through four holes 96 in the bottom end of the upper housing section and are screwed into a like plurality of threaded blind holes 98 (FIG. 8A) in the upper end of the lower housing section.

Figure 4A:
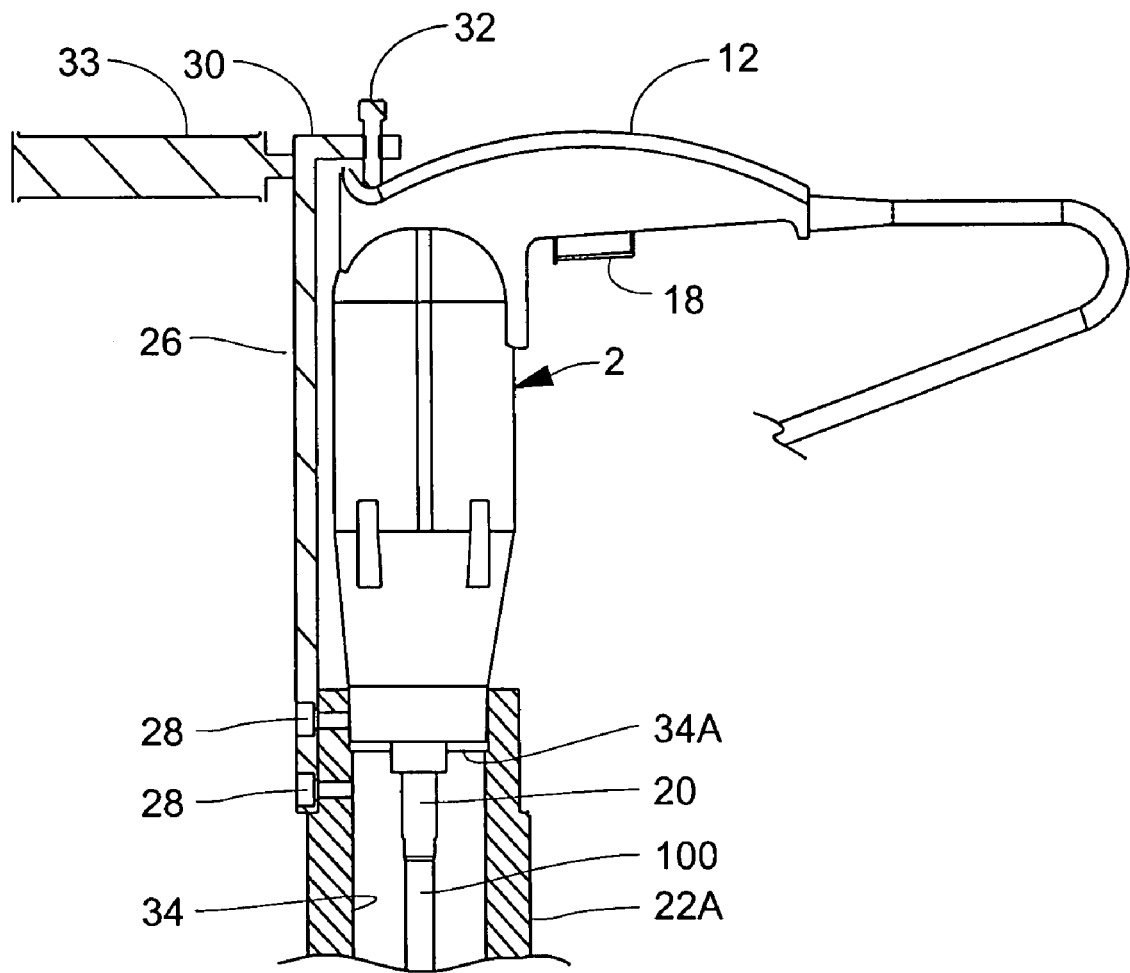
FIGS. 4A and 4b are fragmentary vertical sectional views of upper and lower portions of the apparatus taken along line 4-4 of FIG. 3.
Figure 4B:
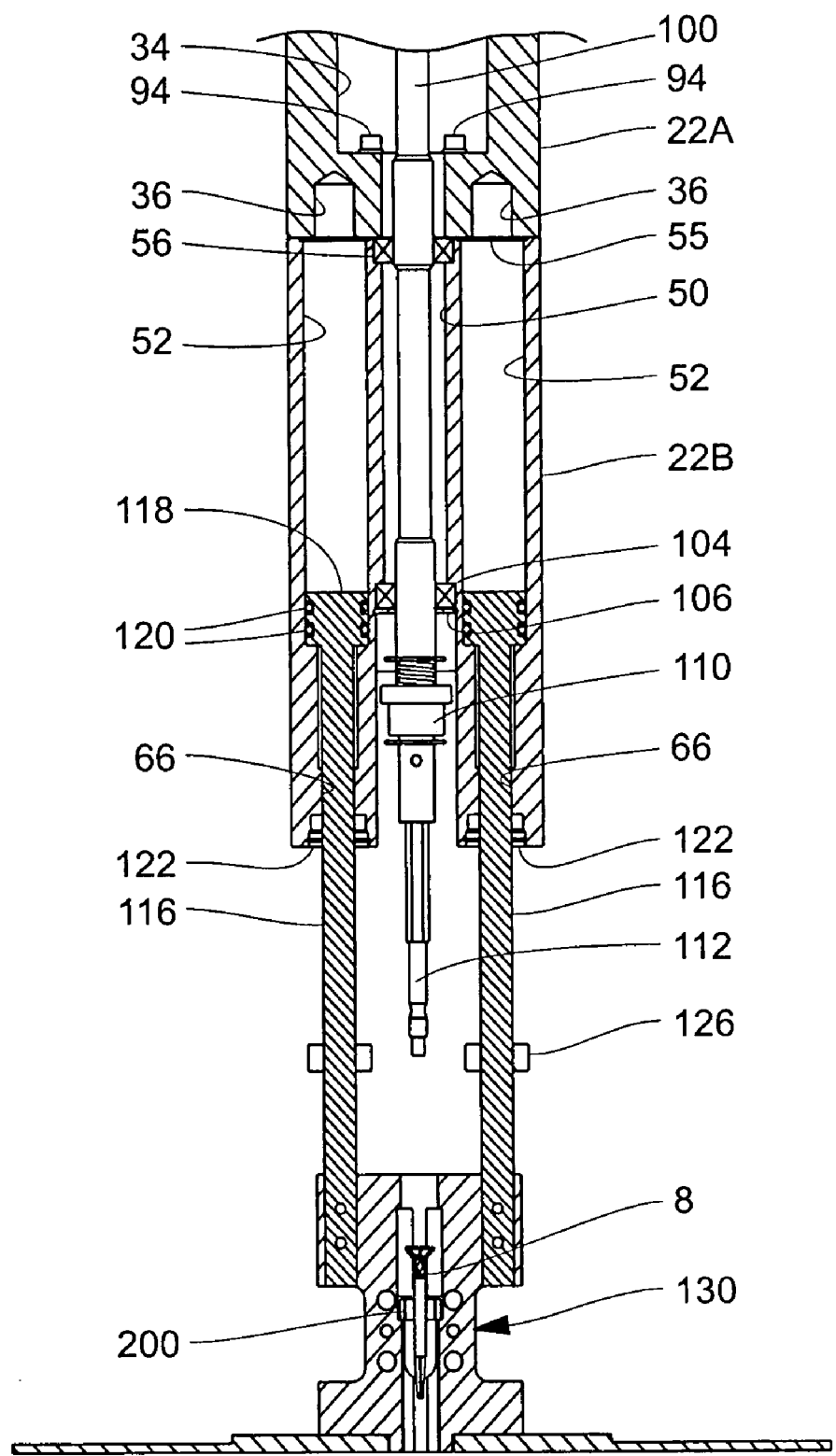

Referring to FIGS. 8A-8D, the lower housing section 22B comprises a center bore 50 and two longitudinally-extending slide bores 52 that are disposed in diametrically opposed alignment with center bore 50. Center bore 50 and bores 52 are aligned and communicate with the center bore 34 and holes 36 respectively of upper housing section 22A, so that holes 36 form top end extensions for slide bores 52. The upper ends of bore 52 are enlarged by counterbores 53 (FIGS. 8A, 8B) that accommodate resilient O-ring seals 55 (FIGS. 4B, 5B) to prevent air leakage between housing sections 22A and 22B. The upper end of center bore 50 is enlarged by a counterbore 54 to accommodate a roller bearing unit 56 (FIGS. 4B, 6B). Center bore 50 also has a second enlarged diameter section 58 at its bottom end, plus a circumferential groove 60. At their bottom ends, each of the two bores 52 is stepped to provide two reduced diameter sections 64 and 66 and a larger diameter multi-stepped section 68 with a circumferential groove 70.

Still referring to FIGS. 8A-8D, lower housing section 22B also has two longitudinally-extending air passageways 78. At their lower ends passageways 78 connect to transversely extending passageways 80 that in turn intersect the reduced diameter sections 64 of bores 52. The upper ends of the two passageways 78 are closed off by the bottom end surfaces of housing section 22A, as shown in FIG. 5B. Adjacent their upper ends air passageways 78 are intersected by transversely extending threaded openings 84 that are fitted with hose connectors 86 (FIG. 5B) for use in securing hoses for passing air as described hereinafter in connection with the electro/pneumatic control system shown in FIG. 12. Referring now to FIGS. 8A and 8D, the top end of lower housing section 22B has a recess 88 and a longitudinally extending bore 92 extends to and communicates with that recess. A second recess 90 is located at the opposite side of the bottom end of housing section 22B.

Now referring to FIGS. 4B and 6B, the aligned central bores 34 and 50 of the upper and lower housing sections are sized to provide rotational clearance for drive shaft 100 which extends through and is engaged with the inner race of roller bearing unit 56. The outer race of roller bearing unit 56 is held in place by the lower end surface of the upper housing section 22A. A second roller bearing unit 104 is mounted in the enlarged section 58 of bore 50 and its outer race is held in place by a retaining ring 106 mounted in groove 60. The inner race of bearing unit 104 surrounds and is engaged with drive shaft 100. The two roller bearing units 56 and 104 function to provide radial support for drive shaft 100 while facilitating its rotation under the influence of driver 2.

Referring again to FIGS. 4B and 6B, the forward end of drive shaft 100 is provided with a connector means 110 for attaching a screwdriver bit 112. The connector means may take various forms, but preferably it is of the quick disconnect type, e.g., as described in my U.S. Pat. No. 6,990,731 cited supra. The recessed section 90 at the bottom end of lower housing section 22B permits ready access to connector means 110, whereby to facilitate attachment and removal of the screwdriver bit. The screwdriver bit 112 is designed to make a locking engagement with the heads of the screws to be driven. In this connection it is to be understood that the heads of the screws may recesses for engagement by the screw driver bit. By way of example but not limitation, the tool bit may be designed for driving screws with heads having Philips type recesses or recesses that define an indented square, rectangle or hexagon. Thus for a screw as shown in FIG. 10, the screwdriver bit has a square cross-sectional configuration.

Referring now to FIGS. 1, 2, 4B, 5B, and 6B, disposed within the two slide bores 52 are two slide rods 116. The latter are sized to make a close sliding fit with the surrounding surfaces of reduced diameter sections 66 of bores 52. The upper ends of slide rods 116 are proved with enlarged heads 118 that function as pistons. Each piston has a pair of grooves to accommodate sealing O-rings 120 that make a sliding engagement with the surrounding wall that defines slide bores 52. The O-rings serve to prevent air from leaking past the piston heads. To further assure against loss of air pressure, annular rod seals 122 are mounted in the bottom ends of slide bores 52.

A U-shaped bracket 126 is mounted on slide rods 116. The slide rods extend through holes in the bracket and the latter is provided with threaded holes that accept set screws 128 which releasably lock the bracket to the slide rods. The set screws allow the bracket to be adjusted vertically on the steel rods.

Referring to FIGS. 9A-9D, the outer ends of slide rods 116 are secured in holes 132 in a positioning plate 130, preferably by means of lock pins (not shown) secured in holes 134 that intersect holes 132. Plate 130 has front and rear surfaces 136 and 138 respectively, a top surface 140, and a bottom surface 142. The upper end of positioning plate 130 has a rearward-extending projection 146 that is provided with a threaded hole 148. The upper end of plate 130 has a round fastener drive bore 150 that is located between and extends parallel to holes 132. As initially formed, round bore 150 was continuous between the upper and lower surfaces 140 and 142. However, on its rear side a portion of plate 130 defining bore 150 has been removed by machining to provide a slot 152, with that slot comprising a relatively wide top section 154, a narrow intermediate section 156, and bottom section 158 that is wider than section 156 but narrower than section 154. The minimum width of slot 152 is slightly larger than the maximum diameter of the wings 214 of the fasteners 8 shown in FIG. 10. The forward surface 160 of slot 152 has a groove 164 that has the same radius of curvature in cross-section as bore 150. The front side of plate 130 has a T-shaped opening 166 (FIGS. 1, 9A) that is aligned horizontally with portions of slot 152 so as to form a passageway through the positioning plate for transit of a plastic strip 200 that carries screw fasteners 9. The upper section of opening 166 has a width that is slightly greater than the width (the cross-wise dimension) of the plastic strip 200 that carries the screw fasteners 8.

The rear side of plate 130 also is provided with two rearwardly-projecting guide pins 170 that are sized to fit in openings in the front surface of magazine 6 and serve to properly locate the magazine in alignment with slot 152. Four through holes 172 are provided in plate 130 to accommodate screws 174 (FIG. 1) that are screwed into tapped holes in the magazine and serve to hold the front end of the magazine tight against the rear face of positioning plate 130.

Referring again to FIGS. 1, 2 and 9A-9D, the bottom side of positioning plate 130 is notched as shown at 258 to accommodate two laterally projecting foot plates 260 that are used to support the apparatus in vertical position and also serve to accommodate the operator's feet, whereby to utilize the weight of the operator to hold the positioning plate tight against the underlying floor panel. The foot plates are secured to plate 130 by screw fasteners not shown. Alternatively they foot rests could be welded to the positioning plate.

Figure 2:
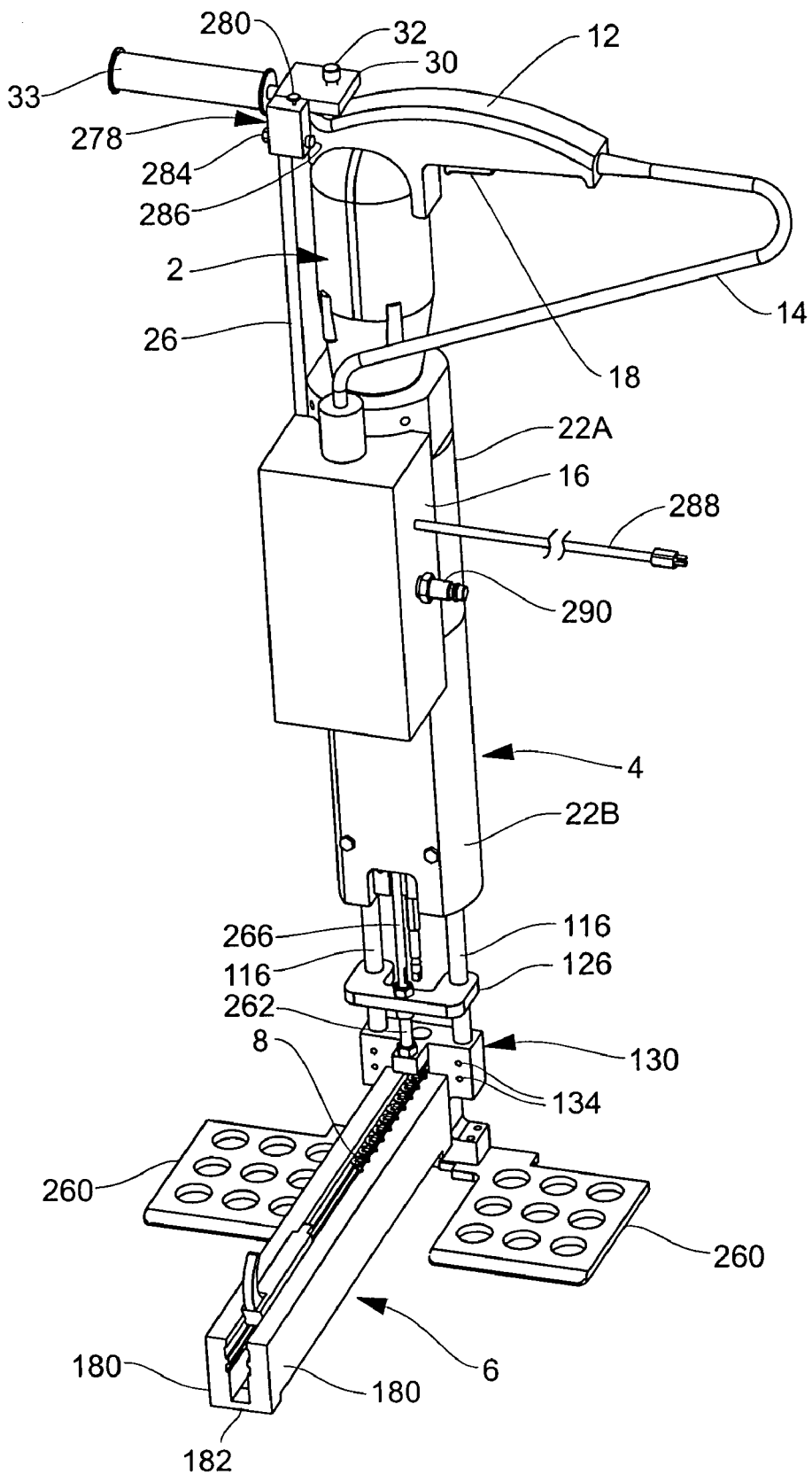
FIG. 2 is a rear perspective view.
Figure 3:
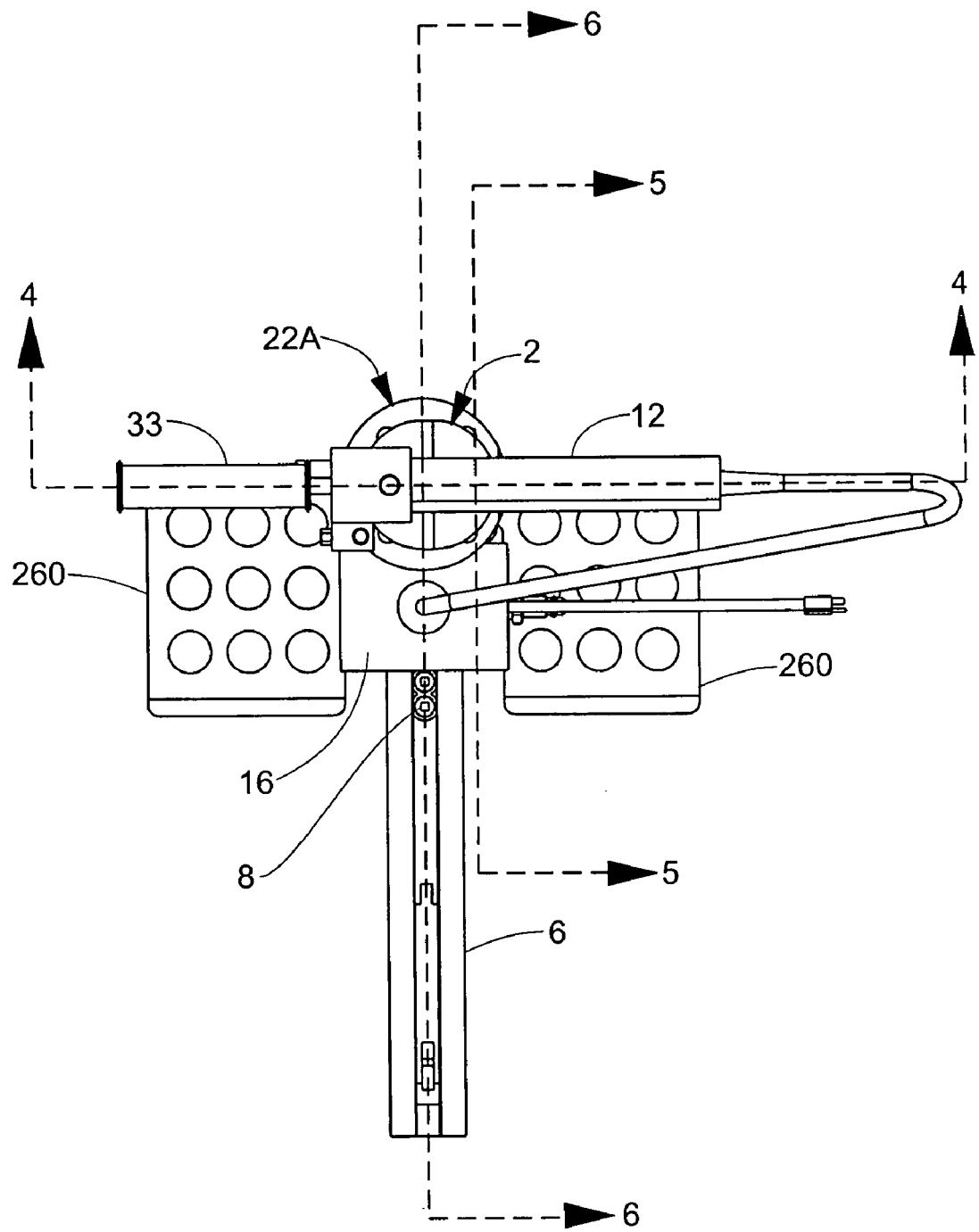
FIG. 3 is a plan view.

Screwed into threaded hole 148 in the rearward extension 146 of the positioning plate is a bolt 262 (FIGS. 2, 6B). A lock nut 264 limits axial adjustment of the bolt. Bolt 262 underlies bracket 126 and acts as a stop to limit downward positioning of bracket 126 on slide rods 116. An actuating rod 266 is slidably positioned in the bore 92 that extends lengthwise in the bottom housing section 22B. The bottom end of rod 266 is threaded and is screwed into a threaded hole in the center portion of bracket 162. A lock nut 267 serves to lock the rod to bracket 126.

Mounted to the bottom end of upper housing section 22A is a pneumatic limit switching valve (limit air switch) 270. The latter has an actuating finger 272 that extends into the recess 44 in the path of actuating rod 266. Limit air switch 270 forms part of the electro/pneumatic system illustrated in FIG. 12. It is normally in an air blocking state and is positioned so that actuating rod 266 can engage its actuating finger 272 when slide rods 116 are retracted into bottom housing section 22B by operation of the electro/pneumatic control system shown in FIG. 12. Engagement of rod 266 with finger 272 will cause limit air switch 270 to change to an air passing state.

Turning again to FIGS. 1 and 2, attached to the support bar 26 is a manually operable pneumatic switching valve (manual air switch) 278 with an actuating button 280 and two ports 284 and 286. Manual air switch 278 is normally in an air blocking state but depression of its actuating button 280 will cause it to change to an air passing state. Ports 284 and 286 are connected by air hoses (not shown) to the electro/pneumatic control system contained in box 16 and illustrated in FIG. 12. The driver's electric power cable also is connected to the electro/pneumatic control system in box 16. Extending outwardly from the side of box 16 is a power cable 288 and a hose connector 290. Cable 288 is for connecting the electro/pneumatic control system to a source of electric power 290 (FIG. 12) and hose connector 290 is for connecting that control system to a source 294 (FIG. 12) of pressurized air, e.g. air at a regulated pressure of 70-100 psi provided by a portable air compressor or an in-plant stationary air compressor.

Referring now to FIGS. 100-11B, the screw fasteners 8 are mounted in a plastic strip 200, the combination constituting a clip of fasteners. Each screw fastener 8 comprises a head 204, a pointed tip 206 and a shaft that comprises a forward self-drilling section consisting of a pair of cutting flutes 208, and a rearward self-tapping section that is characterized by a screw thread 210 that commences at the rearward end of drilling section 208 and preferably extends to where the head 204 joins the shaft. Preferably screw thread 210 has a triangular shape in cross-section, so that the thread has a sharp cutting edge. The maximum diameter of the self-tapping screw section exceeds the maximum diameter of the forward self-drilling section 208, whereby to allow the self-tapping section of the fastener to cut a mating screw thread in the hole formed in a metal substrate by the fastener's forward self-drilling section. Each fastener also is formed with two diametrically opposed relatively thin blade-like wings 214 at the trailing end of the two cutting flutes. Although not shown, it is to be understood that the leading (bottom) edge of each wing, i.e., the end edge closest to the tip 206, is tapered so as to provide a cutting edge that enables the wings to cut into a wood flooring member and form a hole therein that is slightly larger than the o.d. of the threaded section 210 of the fastener.

The flat top surface 220 of screw head 204 is formed with a square recess 226 for interlocking with the driver tool bit 112. Of course, the recess in surface 220 may have a different shape to accommodate a tool bit with a different end configuration. Thus, for example, the fastener head may have a multi-lobe recess, with the lobes being beveled so as to slope inwardly and downwardly from the surrounding portions of top surface 220 to facilitate insertion of a Torx®-style tool bit of like multi-lobe shape.

Additionally, the tapered side surface of head 204 is formed with a plurality of cutting edges 230 which are spaced uniformly from one another about the circumference of the tapered surface. The cutting edges may be provided by a plurality of ribs as shown and described in my U.S. Pat. No. 6,990,731, but preferably as shown they are provided with a plurality of angular facets 232 cut in the tapered surface, as shown and described in my copending U.S. patent application Ser. No. 11/594,595, filed Nov. 8, 2006, for "Self-Drilling, Self-Tapping Screw Fasteners", which application is incorporated herein by reference.

Cutting flutes 208 provide the screw fastener with a self-drilling capability, while the screw thread 210 provides the fastener with a self-tapping and screw fastening capability. The wings 214 provide the fasteners with a drilling capability with respect to a wooden flooring panel or board or other member made of wood or other material of like density, while being fragile enough to break off when subjected to a rotational engagement with a hard substrate such as steel. With that combination capability in mind, the apparatus of the present invention makes it possible to utilize those fasteners to secure together two structural components without need for pre-drilling holes in either component.

Preferably the plastic mounting strip 200 is constructed as disclosed in my aforementioned co-pending U.S. patent application Ser. No. 11/594,595, filed Nov. 8, 2006. It comprises a series of uniformly spaced circular through holes 240 for accommodating the fasteners. Preferably, but not necessarily, the strip is molded of polyethylene, polypropylene or nylon and is of moderate density and flexibility. Strip 200 may have flat longitudinally-extending opposite side surfaces, but preferably those surfaces are contoured with circularly curved segments 242 so that the strip has a series of reduced width portions 244. The contoured side surfaces offer the advantage of reducing the amount of surface area of the strip that is in contact with the magazine, which facilitates its advancement in the magazine toward the face plate 130; it also reduces the amount plastic used to make the strip.

The holes 240 in strip 200 have a constant diameter, except for the presence of a plurality of radially-extending, uniformly spaced fastener-retaining ribs 248. At their upper ends the ribs are connected by thin webs 252 that collectively coact with ribs 248 to form a top annular end wall for the hole 240. Ribs 248 and webs 252 have substantially identical radial dimensions, with their inner ends being curved and tangent to a circle having a diameter which is slightly smaller than the maximum diameter of the threaded portion of the fasteners. The fasteners are mounted in strip 200 as shown in FIGS. 11A and 11B. The maximum outside diameter of the head 204 of each fastener is less than the diameter of the hole 240 in which the fastener is mounted, but larger than the diameter of the circle formed by ribs 248 and webs 252. Ribs 248 and webs 252 grip the threaded portion of the fasteners and hold them in strip 200. Webs 252 help to hold the fasteners perpendicular in holes 240.

The fasteners are inserted by machine into the plastic strip 250. During the insertion operation, the wings 214 tend to damage or cut away by abrasion a small portion of one or more of ribs 248, thereby reducing the grip exerted by the ribs and resulting in the fasteners being somewhat loose rather than being held exactly perpendicular. The existence of play between the fasteners and the plastic strip may interfere with proper driving of the fasteners by the tool bit. The addition of webs 252 increases the total surface area gripping the fasteners and thereby reduces the amount of "play" between the fasteners and the plastic strip that supports them, even though one or more of the webs or ribs may be torn by the wings 214 when the fasteners are inserted into the holes 240. The thickness of webs 252 is kept small to make it easier for the webs to yield rather than tear under the influence of wings 214 when the fasteners are inserted into the sleeves. Making webs 252 thin rather than thick also facilitates expelling of the fasteners from the plastic strip by operation of the screw driver apparatus provided by this invention.

Figure 12:
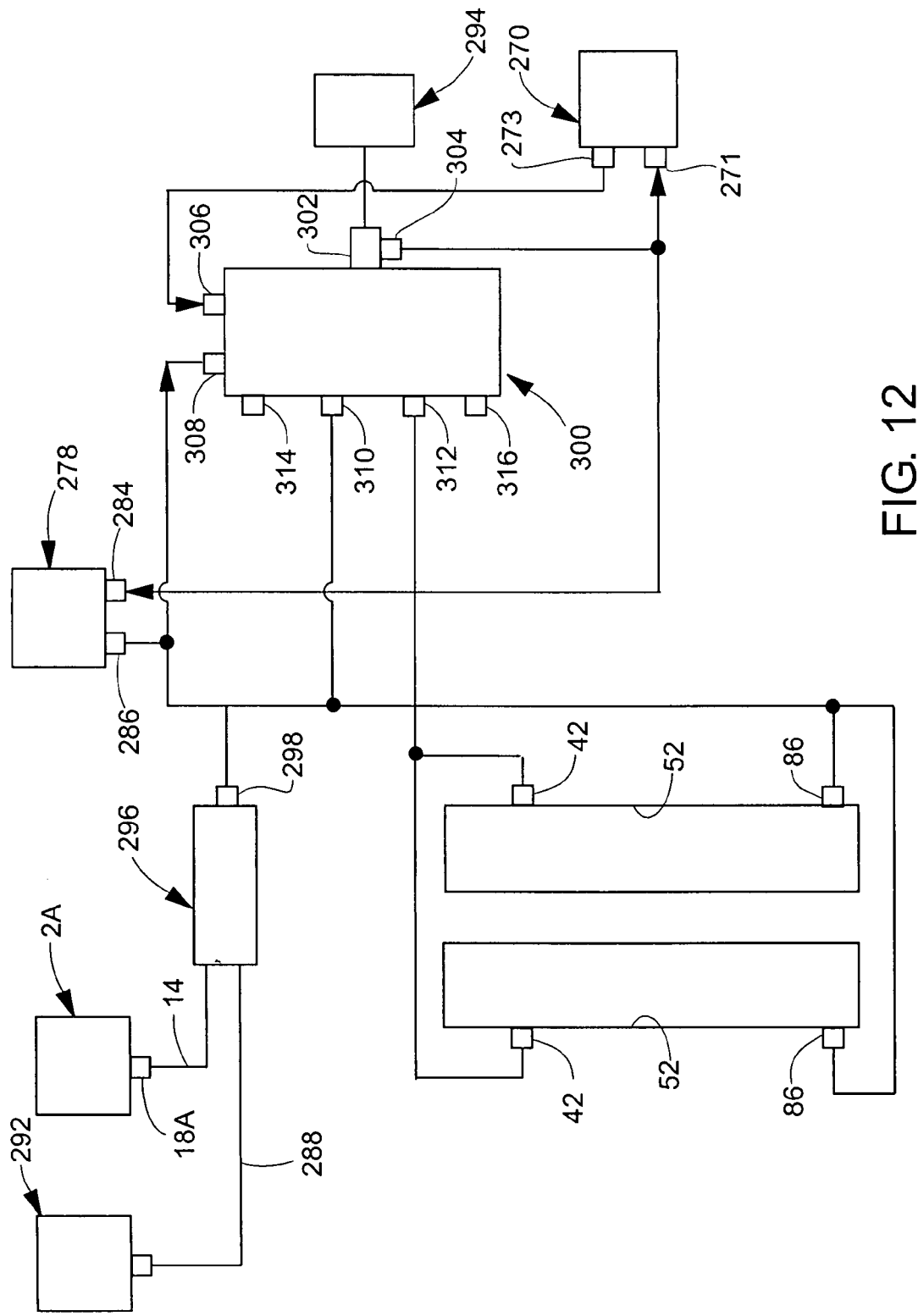
FIG. 12 is a schematic view of the electro/pneumatic operating and control system of the same apparatus.

Referring to FIGS. 1, 2 and 6B, the magazine 6 comprises two mutually spaced side walls 180 that are joined to one another by several cross-members, one of which is shown at 182. The spacing between the mutually confronting inner surfaces of side walls 180 is slightly greater than the width of plastic strip 200. As shown in FIG. 6B, the inner surfaces of side walls 180 are provided with longitudinally extending ribs 184 that serve as supporting rails for fastener-supporting strip 200. A pusher member 186 is slidably mounted between side walls 180 and engages the rear end of strip 200. The pusher member is urged toward positioning plate 130 by a constant force coil spring (not shown) which is rotatably mounted to the pusher member and has its free end attached to one of the side walls 180, as illustrated in FIG. 12 of my prior U.S. Pat. No. 6,990,731 (herein incorporated by reference).

When the strip 200 carrying fasteners 8 is mounted in the magazine, the heads 204 of the fasteners will be above the level of the upper edge of the upper section of T-shaped opening 166; however, the strip 200 will be aligned with the upper section of opening 166, with the upper side of the strip being slightly below the upper edge 167 of opening 150 and the lower side of the strip overlying and engaging the upper edges of the restricted section 156 of slot 152 (which upper edges are in line with the lower edges of the upper horizontally-elongate section of opening 166). Consequently, (a) when the strip 200 is urged into slot 152 of plate 130 by the pusher member, it will be stopped as a result of the forward surface 160 (FIG. 9D) of positioning plate 130 intercepting the head of the leading (first-in-line) fastener carried by the plastic strip, and (b) after the lead fastener is driven out of the plastic strip by the tool bit in the manner hereinafter described and the tool bit withdrawn from the bore 150 of the positioning plate, the leading (now empty) fastener-retaining section of the plastic strip will be forced through the opening 166 until the head of the next-in-line fastener is intercepted by surface 160.

Referring now to FIG. 12, cable 288 connects an electrical power supply 292 to one side of a pneumatically operable, normally-open electric switch 296 having an air inlet port 298. Switch 296 connected in series with the on/off power switch 18A and the electric motor 2A of the driver. Switch 296 closes to pass electric current only when pressurized air is applied to its port 298. An air supply 294 is connected via a hose line to the inlet port of a 4-way pneumatic valve 300 via a coupling 302. Air supply 294 may take various forms, but preferably it is an in-plant electrically powered air compressor capable of providing a regulated stream of pressurized air at a selected pressure, preferably in the range of 70 to 100 psi. The coupling 302 also has a side port 304 connected to one port 271 of limit air switch 270 and to the port 284 of manually operable air switch 278. Valve 300 has a first signal or steering port 306 connected via a hose line to the second port 273 of limit air switch 270, and a second signal or steering port 308 connected to (a) the second port 286 of manually operable air switch 278, (b) the air inlet port of pneumatically operable electric switch 296, and (c) the hose connectors 86 that communicate with the bottom ends of slide bores 52. Valve 300 also has a third port 310 that is connected via hose lines to second steering port 308 and also to the hose connectors 86, and a fourth port 312 that is connected to the hose connectors 42 that communicate with the top ends of slide bores 52. Valve 300 also has two air exhaust ports 314 and 316, and the valve is arranged to shift the air flow from one to the other of ports 310 and 312 and from one to the other of ports 314 and 316 depending on the air pressure levels at the first and second ports 306 and 308. It should be noted, as shown in FIG. 5B, that the diameter of section 64 of slide bore 52 is oversized relative to that of the slide rod 116 that is disposed therein, thereby pivoting clearance to permit air flow between air passageways 78 and the underside of pistons 118.

Operation of the apparatus will now be described with reference to the electro/pneumatic system control shown in FIG. 12. Assume that the air supply 294 is inoperative so that no air is being supplied, and also that piston heads 118 are positioned somewhere between the upper and lower ends of slide bores 52, so that air limit switch 270 is in its normal air blocking state. If now the air supply 294 is rendered operational so as to deliver pressurized air to valve air inlet port 302 and coupling 304, the air pressure at signal port 306 will be low (due to no air being passed by air limit switch 270), causing valve 300 to pass pressurized air to the two upper hose connectors 42 via its port 312, whereby the increased air pressure action on piston heads 118 will cause the slide rods to be extended fully to the position illustrated in FIGS. 1 and 2, with the tool bit 112 elevated a short distance, preferably about ½ to ¾ inch, above the fasteners in magazine 6. Simultaneously the port 310 is connected to exhaust port 314, whereby air is exhausted from the slide bores via the two lower hose connectors 86. At the same time, the pneumatically-operated electric switch 296 is open since the air pressure level at its inlet port 298 is low. With electric switch 296 open, the motor of driver 2 is electrically disconnected from power supply 292, so that closing the on/off switch 18A by depressing driver trigger 18 will not render the driver operative (as explained hereinafter, that result can occur only if trigger 18 and button 280 of manual air switch 278 are depressed at the same time).

To conduct a screw-driving operation, the operator positions the apparatus at the desired location on the components to be fastened together, e.g. a ¾-1⅜ inch thick hard wood flooring member overlying a frame member in the form of a HTS steel I-beam having ⅛ inch thick flanges. The term "flanges" as used herein is intended to identify the portions at the top and bottom sides that project laterally of the center (web) portion of the I beam. The operator then places his feet on the foot rests 260 so that his weight is pressing down the apparatus. Then, to drive a screw, the operator depresses and releases button 280 on manual air switch 278, and also depresses trigger 18. Depressing button 280 causes air switch 278 to change to its air passing state, resulting in pressurized air flowing into steering port 308 and also into port 298 of electric switch 296. The high pressure air at port 298 causes switch 296 to close, thereby coupling the power supply to driver 2. The high pressure air at steering port 308 causes the 4-way pneumatic valve to change states, connecting its port 312 to exhaust port 316 and allowing its port 310 to pass pressurized air to the two lower hose connectors 86. The application of high pressure air via hose connectors 86 to the lower ends of slide bores 52 urges the piston heads 118 upwardly in slide bores 52. At the same time air is exhausted from the upper ends of the slide bores via hose connectors 42 and ports 312 and 316. As a consequence, the apparatus shifts from its extended position to a retracted position, so that the housing 22A, 22B carrying driver 2 moves down toward positioning plate 130, causing tool bit 112 to engage the head 204 of the first in line of the screw fasteners 8 disposed in the magazine. Since the air-operated electric switch 298 is closed as a consequence of depression of button 280 of air switch 278, and with trigger 18 also being depressed, driver 2 will be energized to rotate drive shaft 100 and tool bit 112, whereupon the tool bit will engage the surrounding surfaces of the recess in the head of the first-in-line fastener 8 and, as a consequence of the axial force produced by retraction of the slide rods into the housing 22A, 22B and the rotational force produced by driver 2, the screw driver bit will drive the screw through the flooring member into locked relation with the underlying metal frame member.

As the housing 22A, 22B carrying driver 2 moves down toward positioning plate 130, actuating rod 266 moves upward in bore 92 since it is locked to plate 126, ultimately resulting in the rod's engagement with operating finger 272 of limit air switch 270, whereupon the latter switches to its air passing state and thereby causes high pressure air to be reapplied to steering port 306. When that occurs, the 4-way valve again reverses states, restoring high pressure air flow to the upper ends of slide bores 52 via its port 312 and upper hose connectors 42 and simultaneously exhausting air from the lower ends of the slide bores via hose connectors 86 and valve ports 310 and 314, whereupon the downward movement of the tool bit 112 is stopped and immediately shifted to an upward movement as the slide rods are extended by the high pressure air input at hose connectors 42. With port 310 again connected to exhaust port 314, port 298 of electric switch 296 will again be at a reduced pressure, causing it to reopen and de-energize the motor of driver 2.

The point at which the downward movement of the tool bit is terminated can be adjusted by rotating bolt 262 so as to move it up or down relative to the face plate and adjusting the position of bracket 126 on the slide rods so that it remains engaged with bolt 262. Rotation of the bolt permits relatively precise adjustment of the position of bracket 126. Adjusting the position of bracket 126 so as to increase the vertical distance between it and the top side of the face plate will cause the downward movement of the tool bit to be stopped earlier. This adjustment feature provides control of the depth of the countersink formed by the screw head as the screw is driven into the wood floor member.

The screw driving operation involves two actions: driving the first-in-line screw out from the plastic strip and also the driving that screw through the hard wood member into the underlying metal frame member. With respect to that first action, the axial and rotational forces exerted on the first-in-line screw by the screw driver bit 112 will cause cutting edges 230 to rapidly chew away the ribs 248 and webs 252 that surround and grip that fastener. With respect to the second action, the cutting flutes 208 and wings 214 will drill through the wood panel and then flutes 208 will drill a hole in the underlying steel frame member. As the cutting flutes 208 penetrate the metal substrate, the relatively weak wings 214 engage that substrate and will be sheared off as a result of the resistance to penetration offered by the HTS steel substrate. When the forward portion of the screw thread 210 encounters the hole in the underlying metal substrate formed by the cutting flutes, the leading turn of the screw thread will commence a screw-tapping operation, whereby continued rotation of the fastener under the influence of the downward pneumatic force of the apparatus will cause screw thread 210 to form a mating screw thread in the surrounding metal surface that defines the hole formed by cutting flutes 208, with the formed screw thread in the metal substrate making a screw connection with the driven screw, whereby the wood panel is secured to the metal substrate. As the screw penetrates the HTS steel frame member, the cutting edges 230 on the screw head cut a tapered countersink in the hard wood member for the screw head. Once the leading (first-in-line) screw has been driven and the screw driver bit retracted, the pusher 186 moves the leading end of plastic strip 200 forward through the T-shaped opening 166 so as to position the next-in-line fastener in line with bore 150 of the positioning plate.

It is to be noted that trigger 18 of driver 2 may be depressed to close the on/off power switch 18A before or after the tool bit has contacted the lead fastener 8 located within positioning plate 130. Bolt 264 and bracket 126 are set so that actuating rod 266 will engage and move the actuating finger of air limit switch 270 just as the head of the driven screw becomes fully seated with its upper surface 220 flush with or below the top surface of the hard wood member, whereupon limit air switch 270 changes to an air passing state whereby high pressure air is applied to signal port 306 as described above. For freight trailer flooring, it is preferred to position bracket 126 so that actuating rod 266 will actuate air limit switch 270, and thereby terminate the screw driving action, when the screw has penetrated the HTS steel member far enough for its head to be recessed ⅛ inch below the top surface of the hard wood member.

A significant aspect of the invention is that it improves upon the apparatus disclosed in my U.S. Pat. No. 6,990,731 by using a relatively low power and relatively low cost electric rotary driver instead of a pneumatic driver, and also reduces the size and cost of the air compressor required to provide pressurized air to the unit 4. By way of example but not limitation, self-drilling, self-tapping high carbon steel screws (as illustrated in FIGS. 10-11B) having a shank diameter of 8.0 mm, exclusive of wings 214, and a head diameter of 14-15 mm, can be driven through 1.5 inch hard wood floor members into ⅛-⅜ inch thick HTS steel structural members, e.g., the flanges of I-beams, in 6-8 seconds using an apparatus as herein described characterized by an electrically-powered driver having an a.c. electric motor with a rating of 8.5 amps (approximately 1.3 HP) and a no-load rotational speed of 1100 rpm, with a ½ HP electrically powered air compressor delivering about 1 cubic foot of air at a pressure of 80-90 psi to control valve 300.

A further advantage of the invention is that use of a relatively low power electrically driven driver as herein described is rendered feasible because of its attachment to the telescoping driver support/fastener positioning unit and the provision of foot rests 260. In this connection it is to be appreciated that a substantial, consistent and uniform downward force is rapidly applied to the screw driver bit as a consequence of the pneumatically-powered downward movement of the housing relative to slide rods 116, and that as the driven screw encounters and penetrates the wood flooring panel or other structural member a reactive force is generated that is in opposition to that downward force and tends to lift the positioning plate 130 up away from the underlying wood flooring member. However, that reactive force is offset by the operator's weight resting on foot rests 260, with the result that positioning plate 130 is held tight against the surface into which the fastener is to be driven and the downward force resulting from retraction of the slide rods provides the necessary axial force to cause the screw to penetrate and secure the wood flooring member to the underlying steel structural member, with the operator's arms having to exert little or no downward force on the apparatus for the screw-driving operation. The downward force generated by the pneumatic telescoping action varies with air pressure and piston head/slide bore/slide rod dimensions and is substantial, e.g., a downward force in excess of 100 pounds using 90 psi air. As a consequence the apparatus of this invention is more effective, less tiring for the operator, and more productive than prior powered screw driving devices designed or intended for the same purposes.

In comparison, it has been determined that the following results are obtained by attempting to drive screws using the same electrical driver by itself, i.e., without driver support/fastener positioning unit 4, and relying solely on the operator's strength to cause the driver to apply an axial force to the screws: (1) it is virtually impossible to drive screws that have a shank diameter of 8.0 mm through a workpiece consisting of ¾ to 1⅜ inch thick hard wood flooring and a ⅛ inch thick HTS steel substrate; and (2) driving screws with a shank diameter of 6.0 mm through the same workpiece can be accomplished, but that screw driving operation is very slow and requires the operator to use his full strength to exert enough downward force on the driver to cause the screw to penetrate the HTS steel substrate.

Another advantage of an apparatus made according to the present invention is that the electric driver stops driving the fastener automatically when the fastener has been driven to the desired depth, thereby preventing premature wearing or shearing of the tool bit (a time and cost savings) and assuring consistent depth of penetration of the fasteners into the wood/metal substrate. Also the means for limiting the length of the downward stroke of the driver allows for shortening or lengthening that stroke according to the length of the fasteners that are to be driven. A further advantage is that in relation to the improved device disclosed in my U.S. Pat. No. 6,990,731, it requires a smaller and less expensive air compressor and produces less operating noise.

Other advantages are that the apparatus may accommodate fasteners of different sizes and that one size plastic strip may be used to support fasteners of like diameter but different lengths. Different length screws are accommodated by varying the vertical position of the screws in the pneumatic strip. A further important advantage is that fasteners which have been applied by the driver apparatus herein described and illustrated, e.g., to secure flooring members to a substrate, may be removed by using a driver capable of operating in an unscrewing mode. This is of particular importance in the case of repairs to trailer bodies that involve removal of hard wood floor or wall paneling.

Another advantage of the invention is that it may be used to attach wood floor and wall members or other structural members to metal substrates in various forms, e.g., I-beams, tapered channel members, angle iron members, or flat metal plates. Also little or no jamming of fasteners has been found to occur, resulting in less down time and greater productivity. In this connection is should be noted that access to the face plate for inspection is facilitated by the fact that removal of the magazine is easily accomplished. Other advantages of the invention will be obvious to persons skilled in the art.

The invention is susceptible of modifications. Thus, for example, the electro/pneumatic operating and control system may be modified while providing the same mode of operation as herein described. The arrangement of components used to adjustably limit the downward stroke of the telescoping driver support/fastener positioning unit 4 and the manner of attaching the driver to the unit 4 also may be varied. The a.c. driver may be replaced by one powered by d.c. current. Also a reversible driver may be used. Still other modifications of the invention will be obvious to persons skilled in the art from the foregoing description and the attached drawings.

What is claimed is:

1. Apparatus for use in attaching a first structural member to an underlying structural member using screw fasteners comprising:

an electric motor-powered rotary driver having an output shaft and a manually operable normally open switch connecting the motor of said driver to a source of electric power, said driver when energized by closing of said switch operating to rotate said output shaft;

a connector connected to said output shaft for coaxially supporting a screw driver bit so that rotational and axial movement of said output shaft will be transmitted to said screw driver bit;

a positioning plate, said positioning plate having a top end surface, a bottom end surface, and front and rear surfaces, a fastener drive bore extending between and through said top and bottom surfaces coaxial with said output shaft, a passageway extending between and through said front and rear surfaces and intersecting said drive bore, and a pair of foot rests extending laterally away from said positioning plate at the bottom end of said positioning plate whereby by standing on the foot rests an operator of the apparatus can use his body weight to hold the positioning plate against the structural members that are to be attached to one another;

pneumatically-operated telescoping means coupling said positioning plate to said driver so that said driver and said drive shaft can be moved toward and away from said top end surface of said positioning plate;

whereby when said bottom end surface of said positioning plate is positioned on and engaged with a first structural member that is to be attached to an underlying second structural member, said telescoping means permits said driver to be moved from an elevated position down toward said first structural member to bring a screw driver bit attached to said output shaft into engagement with the head of a screw fastener positioned in said fastener drive bore, so that operation of said driver will cause said screw fastener to be driven through said first structural member into said second structural member under the rotational and axial forces transmitted to said screw fastener by a screw driver bit attached to said shaft.

2. Apparatus according to claim 1 further including a plastic strip carrying a plurality of self-drilling, self-tapping screw fasteners with each screw fastener having an enlarged head, said plastic strip extending into said passageway with the screw fastener carried first-in-line by said strip being engaged with an interior surface of said positioning plate in line with said drive bore; and a pusher member for advancing said plastic strip in said passageway in the direction of said interior surface.

3. Apparatus according to claim 2 wherein said strip carrying said screw fasteners is supported by a magazine disposed adjacent to and in fixed relation with said positioning plate, and further wherein said pusher member forms part of said magazine.

4. Apparatus according to claim 3 wherein when said driver is in said elevated position, said shaft and a screw driver bit attached to that shaft are spaced above the level of the heads of the plurality of screw fasteners carried by said strip.

5. Apparatus according to claim 1 further including a switch for preventing energization of the motor of said driver by closing of said manually operable normally open switch while said driver is in said elevated position and enabling energization of the motor of said driver by closing of said manually operable normally open switch while said driver is moving toward said positioning plate.

6. Apparatus according to claim 1 further including a switch for de-energizing the motor of said driver when said driver has moved a predetermined distance from said elevated position.

7. Apparatus according to claim 1 further including a travel limiter for limiting the extent of movement of said driver toward said fastener positioning plate.

8. Apparatus according to claim 7 wherein said travel limiter includes an actuating member movable relative to said driver, adjustable means attached to said positioning plate and engaged by said actuating member for causing said actuating member to move relative to said driver as said driver is moved toward said positioning plate, and means actuatable by said actuating member for causing termination of movement of said driver toward said positioning plate in response to movement of said actuating member by said adjustable means.

9. Apparatus according to claim 1 further including a pneumatically operated electrical switch for controlling energization of said driver, multi-port valve means adapted for connection to a source of pressurized air, said multi-port valve having switchable states for controlling flow of pressurized air into and exhaustion of air from said pneumatically-operated telescoping means, and first and second selectively operable air valve means for controlling operation of said multi-port valve means so as to cause said telescoping means to move said driver from said elevated position toward said positioning plate and then back to said elevated position responsive to changes of states of said multi-port valve means.

10. Apparatus according to claim 9 wherein said first selectively operable valve means is manually operable and said second selectively operable valve means is operable by mechanical means comprising a first member fixed with respect to said positioning plate and a second movable actuating member that is moved by said first member when said driver has moved a predetermined distance from said elevated position toward said positioning plate.

11. Apparatus according to claim 10 wherein said operation of said pneumatically operated electrical switch is controlled by said first manually operable valve means.

12. Apparatus according to claim 11 further including a screw driver bit attached to said shaft, said screw driver bit having a leading end adapted to make mechanical engagement with the head of a fastener located in said drive bore, and further wherein when said driver has moved said predetermined distance from said elevated position said leading end of said screw driver bit will protrude from said bottom surface of said positioning plate.

13. Apparatus for use in connecting structural members together by means of fasteners, said apparatus comprising:

an electric motor-powered rotary driver, said driver including a cable for connecting the motor of said driver to a source of electrical power and a normally-open manually-operable driver switch connecting said cable to the motor of said driver;

a drive shaft attached to said driver whereby energization of said driver will cause said driver to rotate said drive shaft;

a driver support/fastener positioning unit comprising an elongate housing, a positioning plate, and telescoping means coupling said housing to said positioning plate so that said housing can be moved toward and away from said positioning plate;

said housing having first and second ends and an axial bore, a support at said first end of said housing for securing said driver to said housing with said drive shaft disposed within said axial bore and protruding from said second end of said housing;

said positioning plate having a top end surface, a bottom end surface, and a fastener drive bore extending between and through said top and bottom surfaces, said fastener drive bore being coaxial with said axial bore;

said telescoping means comprising at least one slide bore formed in said housing, and a slide rod slidably disposed in and protruding from said at least one slide bore, said at least one slide rod having an end outside of said slide bore that is attached to said positioning plate at the top end thereof, and first and second openings in said housing for introducing air to and exhausting air from first and second opposite ends respectively of said slide bore;

control valve means connected to said first and second openings and operative when coupled to a source of pressurized air for selectively (a) introducing air to said at least one slide bore via said first opening and exhausting air from said at least one slide bore via said second opening whereby to cause said at least one slide rod to move in a downward direction in said at least one slide bore to move said housing and said drive shaft away from said top end surface of said positioning plate and (b) exhausting air from said at least one slide bore via said first opening and introducing air to said at least one slide bore via said second opening whereby to cause said at least one slide rod to move in an upward direction in said at least one slide bore to move said housing and said drive shaft toward said top end surface of said positioning plate; and control means for operating said control valve means so as to cause said at least one slide rod to first move in an upward direction in said at least one slide bore whereby to move said housing and said drive shaft downward toward said positioning plate to a selected down position and then to move in a downward direction in said at least one slide bore whereby to move said housing and said drive shaft upward again to a selected up position;

said control means including additional electrical switch means connected to said cable in series with said manually-operable driver switch, said additional electrical switch means being normally open, and further including manually operable means controlling operation of said control means, said control means including means for closing said additional electrical switch means in response to operation of said manually operable means so that said driver is energized by actuation of said normally-open manually-operable driver switch only after operation of said manually operable means.

14. Apparatus according to claim 13 wherein said positioning plate is provided with foot rest means for permitting an operator of the apparatus to apply foot pressure to hold said positioning plate in engagement with a structural member that is to be attached to another structural member.

15. Apparatus according to claim 13 including a connector for coaxially attaching to said drive shaft a tool bit that is adapted to make a locking engagement with the head of a fastener positioned in said fastener drive bore.

16. Apparatus according to claim 13 wherein said control means further includes an adjustable bracket for limiting upward movement of said at least one slide rod in said at least one slide bore.

17. Apparatus according to claim 13 further including a magazine for introducing fasteners into said fastener drive bore in position for driving engagement by a tool bit attached to said drive shaft.

18. Apparatus according to claim 13 wherein said housing has a pair of longitudinally extending slide bores, and said telescoping means comprises a pair of slide rods slidably received in slide bores, with said slide rods having outer ends attached to said positioning plate, and each of said slide bores has first and second openings for introducing air to and exhausting air from opposite ends of said slide bores.

19. Apparatus according to claim 18 wherein both of said slide rods have piston heads disposed in said slide bores, said piston heads making a close sliding fit with said slide bores.

20. Apparatus according to claim 19 wherein said valve means is adapted to be connected to a source of pressurized air.

21. Apparatus according to claim 20 wherein source of pressurized air is a compressor powered by an electric motor or a combustion engine.

22. Apparatus according to claim 18 wherein said control valve means is a multi-port valve having a first inlet port adapted to be connected to a source of pressurized air and second and third ports that are connected to said first and second openings respectively, said valve being operable to alternately (a) pass pressurized air from said first inlet port to said first opening via said second port and pass air from said second opening to the atmosphere via said third port and (b) pass pressurized air from said first inlet port to said second opening via said third port and pass air from said first opening to the atmosphere via said second port.

23. Apparatus according to claim 22 wherein said control valve means is operated pneumatically.

24. Apparatus according to claim 13 wherein said driver has a handle, and further including an auxiliary handle attached to housing adjacent to said driver, whereby said apparatus may be held by an operator's two hands when used to drive fasteners.

25. Apparatus according to claim 13 further including a magazine attached to said positioning plate having a plastic strip for holding a strip of fasteners arranged in single file and a pusher mechanism for feeding those fasteners into said fastener drive bore in position for driving engagement by a tool bit attached to said drive shaft.

26. Apparatus for use in securing structural members to one another by means of screw fasteners, said apparatus comprising:
  an electrically powered driver having a housing and an output shaft extending from said housing that rotates when said driver is energized, said driver having a cable for connecting it to a source of electrical power and a manually operable normally closed electrical on-off switch interposed between the cable and said driver for controlling flow of electric current to said driver;
  a housing having first and second ends and an axial bore, an attachment means at said first end of said housing for securing said driver to said housing, and a drive shaft attached to and coaxial with said output shaft so as to form an extension of said output shaft, said drive shaft being rotatably disposed within said axial bore and having an outer end remote from said output shaft;
  a positioning plate, said positioning plate having a top end surface and a bottom end surface, a fastener drive bore extending between and through said top and bottom surfaces, said fastener drive bore being coaxial with said drive shaft, and foot rests on which an operator may stand to allow his weight to press said positioning plate down to hold said bottom end surface in tight engagement with a structural member that is to be secured to another structural member;
  a connector for coaxially attaching to said outer end of said drive shaft a tool bit that is adapted to make a locking engagement with the head of a screw fastener positioned in said fastener drive bore;
  telescoping means interposed between and coupling said positioning plate to said housing so that said housing can be moved toward and away from said positioning plate between a first elevated position and a second lowered position relative to said positioning plate;
  first pneumatic means operative when said housing is in said first elevated position for causing said telescoping means to move said housing from said first elevated position to said second lowered position, whereby when said bottom end surface of said positioning plate is positioned on a first structural member that is to be attached to a second underlying structural member, the downward movement of said housing will bring a tool bit attached to said drive shaft into engagement with the head of a screw fastener positioned in said fastener drive bore and continued movement of housing toward said second lowered position will cause said tool bit to drive said screw fastener through said first structural member into said second structural member under forces transmitted by said drive shaft to said tool bit; and
  second pneumatic means operative when said housing has reached said second lowered position for causing said telescoping means to stop downward movement of said housing and to move said housing in an upward direction back to said first elevated position.

27. Apparatus according to claim 26 wherein said manually operable normally closed electrical on-off switch is a pneumatically-operated electric switch.

28. Apparatus according to claim 27 further including an adjustable bracket for varying the height of said lowered position of said housing.

29. Apparatus according to claim 26 further including a magazine attached to said positioning plate, said magazine comprising a plastic strip for holding a strip of fasteners arranged in single file and a pusher member for feeding those fasteners into said fastener drive bore in position for driving engagement by a tool bit attached to said drive shaft.

30. Apparatus according to claim 26 wherein said telescoping means comprises a pair of longitudinally extending slide bores in said housing and a pair of slide rods slidably received in slide bores and attached to said positioning plate.

31. Apparatus according to claim 30 wherein said slide rods have heads slidably disposed in said slide bores and said slide bores and said slide rod heads form cylinder/piston arrangements, and further wherein said first and second pneumatic means comprise a valve for delivering a pressurized fluid to and removing pressurized fluid from said slide bores, whereby pneumatic forces may be applied to or removed from said slide rod heads to vary the position of said slide rods in said slide bores.

32. Apparatus according to claim 26 further including a selectively operable switch for preventing operation of said driver by closing of said on-off switch.

33. Apparatus according to claim 32 wherein said selectively operable switch comprises a pneumatically-actuated electrical switch that is normally open, and further including manually-operable means connected to said first and second pneumatic means for (a) initiating operation of said first pneumatic means whereby to move said housing from said first elevated position to said second lowered position and (b) pneumatically cause said pneumatically-actuated electrical switch to close whereby to permit energization of said driver by closing of said driver on-off switch.

* * * * *